United States Patent
Xiao et al.

(10) Patent No.: US 12,003,140 B2
(45) Date of Patent: Jun. 4, 2024

(54) ROTOR FOR MOTOR, DRIVE MOTOR AND VEHICLE

(71) Applicant: ANHUI WELLING AUTO PARTS CO., LTD., Anhui (CN)

(72) Inventors: Yang Xiao, Anhui (CN); Ziqiang Zhu, Anhui (CN); Jintao Chen, Anhui (CN); Di Wu, Anhui (CN)

(73) Assignee: ANHUI WELLING AUTO PARTS CO., LTD., Anhui (CN)

( * ) Notice: Subject to any disclaimer, the term of this patent is extended or adjusted under 35 U.S.C. 154(b) by 334 days.

(21) Appl. No.: 17/515,978

(22) Filed: Nov. 1, 2021

(65) Prior Publication Data

US 2022/0060071 A1 Feb. 24, 2022

Related U.S. Application Data

(63) Continuation of application No. PCT/CN2019/130064, filed on Dec. 30, 2019.

(51) Int. Cl.
*H02K 1/276* (2022.01)
*H02K 1/274* (2022.01)
*H02K 1/2753* (2022.01)

(52) U.S. Cl.
CPC .......... *H02K 1/2766* (2013.01); *H02K 1/274* (2013.01); *H02K 1/2753* (2013.01); *H02K 1/276* (2013.01)

(58) Field of Classification Search
CPC .. H02K 1/2766; H02K 1/246; H02K 2213/03; H02K 1/272; H02K 1/27;
(Continued)

(56) References Cited

U.S. PATENT DOCUMENTS 7,151,335 B2 12/2006 Tajima et al.
2008/0136281 A1 6/2008 Fujii et al.
(Continued)

FOREIGN PATENT DOCUMENTS

CN 101272066 A 9/2008
CN 103023180 A 4/2013
(Continued)

OTHER PUBLICATIONS

First Office Action dated May 26, 2022 received in Chinese Patent Application No. CN 201911401741.X together with an English language translation.
(Continued)

*Primary Examiner* — Alexander A Singh
(74) *Attorney, Agent, or Firm* — Scully, Scott, Murphy & Presser, P.C.

(57) ABSTRACT

A rotor for a motor is provided. The rotor has a rotor core, first permanent magnets mounted in first grooves of the rotor core, and second permanent magnets mounted in second grooves of the rotor core. The rotor core is provided with groove groups distributed in a peripheral direction of the rotor core. Each groove group has an air groove, a first groove and a second groove. The ends of the air groove, the first groove and the second groove, which are close to a center point of the rotor core, are close to one another. The end of the air groove, the first groove and the second groove, which are away from the center point of the rotor core, are away from one another. Multiple magnetic isolation structures are provided in the rotor core.

22 Claims, 13 Drawing Sheets

(58) Field of Classification Search
CPC .... H02K 1/274; H02K 1/2753; H02K 1/2773;
                                           H02K 1/276
USPC ............ 310/156.83, 156.84, 156.57, 156.53,
                  310/156.32, 156.56, 156.58
See application file for complete search history.

(56) References Cited

U.S. PATENT DOCUMENTS

| | | | |
|---|---|---|---|
| 2009/0045688 A1 | 2/2009 | Liang et al. | |
| 2009/0236923 A1* | 9/2009 | Sakai | H02K 21/16 310/156.43 |
| 2010/0148612 A1 | 6/2010 | Takemoto et al. | |
| 2012/0200193 A1* | 8/2012 | Sano | H02K 1/2766 310/216.106 |
| 2013/0313936 A1* | 11/2013 | Shibata | H02K 1/2746 310/156.43 |
| 2015/0171683 A1 | 6/2015 | Kim et al. | |
| 2017/0155294 A1 | 6/2017 | Chiu | |
| 2018/0062461 A1 | 3/2018 | Gieras | |
| 2020/0220398 A1* | 7/2020 | Takahashi | H02K 1/276 |

FOREIGN PATENT DOCUMENTS

| | | |
|---|---|---|
| CN | 105914925 A | 8/2016 |
| CN | 106026585 A | 10/2016 |
| CN | 107317415 A | 11/2017 |
| CN | 108418321 A | 8/2018 |
| CN | 208316442 U | 1/2019 |
| CN | 208923939 U | 5/2019 |
| CN | 110323863 A | 10/2019 |
| JP | 2004-104962 A | 4/2004 |
| WO | 2019220798 A1 | 11/2019 |

OTHER PUBLICATIONS

International Search Report dated Sep. 27, 2020 issued in PCT/CN2019/130064.

Supplementary European Search report dated Jul. 19, 2022 dated Jul. 19, 2022 received in European Patent Application No. 19958192.7.

* cited by examiner

ROTOR FOR MOTOR, DRIVE MOTOR AND VEHICLE

CROSS-REFERENCE TO RELATED APPLICATION

The present application is a continuation applications of PCT International Application No. PCT/CN2019/130064, filed on Dec. 30, 2019, the entire content of which is incorporated herein by reference for all purposes. No new matter has been introduced.

FIELD

This application relates to the field of motors and, more particularly, to a rotor for a motor, a drive motor, and a vehicle.

BACKGROUND

Rotors for motors with interior permanent magnets in the related art have a large difference of current advancing angle between the peak point of a permanent magnet torque and the peak point of a reluctance torque, resulting in low utilization rate of the reluctance torque and the permanent magnet torque at the peak point of the combined output torque. In addition, the rotors for motors with interior permanent magnets in the related art suffer from large magnetic flux leakage of the permanent magnets, low material utilization, and iron core saturation.

SUMMARY

The present disclosure aims to at least solve one of the problems in the related art. Accordingly, an objective of the present disclosure is to propose a rotor for a motor, which enhances the maximum output torque of the motor and improves the utilization rates of the permanent magnet torque component and the reluctance torque component at the maximum torque point.

Another objective of the present disclosure is to propose a drive motor having the rotor as described above.

Another objective of the present disclosure is to propose a vehicle having the drive motor as described above.

The rotor according to certain embodiments of the present disclosure includes: a rotor core including a plurality of groove groups distributed along a peripheral direction of the rotor core, each groove group including an air groove, a first groove, and a second groove; a plurality of first permanent magnets mounted in the first groove; and a plurality of second permanent magnets mounted in the second groove. Respective first ends, near a center point of the rotor core, of the air groove, the first groove, and the second groove are close to one another. Respective second ends, away from the center point of the rotor core, of the air groove, the first groove, and the second groove are away from one another. A first magnetic isolation structure is arranged between the first end of the air groove and the first end of the first groove that are close to each other. A second magnetic isolation structure is arranged between the first end of the first groove and the first end of the second groove that are close to each other. The second ends, away from the center point of the rotor core, of the air groove, the first groove and the second groove are distributed along a first rotation direction of the rotor.

For the rotor according to certain embodiments of the present disclosure, the asymmetric structure of the rotor significantly reduces a difference between a current advancing angle corresponding to a peak point of a permanent magnet torque and a current advancing angle corresponding to a peak point of a reluctance torque, with the same amount of permanent magnets and the same inner and outer diameters of the rotor, thereby enhancing the maximum torque and improving the utilization rates of the permanent magnet torque component and the reluctance torque component at the maximum torque point, and thereby contributing to the improvement on the power density of the motor and the reduction in the permanent magnetic flux leakage. As a result, the material utilization rate can be improved, and the amount of permanent magnets and production costs can be decreased.

Moreover, the rotor according to the above embodiments of the present disclosure may have the following additional technical features.

For the rotor according to some embodiments of the present disclosure, the first groove includes a third magnetic isolation structure on a side of the first groove away from the center point of the rotor core, the second groove includes a fourth magnetic isolation structure on a side of the second groove away from the center point of the rotor core, and the air groove includes a fifth magnetic isolation structure on a side of the air groove away from the center point of the rotor core. Along the first rotation direction, an angle $\alpha$ formed between a line connecting a back endpoint of the third magnetic isolation structure to the center point of the rotor core and a line connecting a back endpoint of the fifth magnetic isolation structure to the center point of the rotor core is smaller than an angle $\beta$ formed between the line connecting the back endpoint of the third magnetic isolation structure to the center point of the rotor core and a line connecting an advancing endpoint of the fourth magnetic isolation structure to the center point of the rotor core.

According to some embodiments of the present disclosure, an interval L1 between a first end of the first permanent magnet near the center point of the rotor core and a second end of the first permanent magnet away from the center point of the rotor core is less than or equal to an interval L2 between a first end of the second permanent magnet near the center point of the rotor core and a second end of the second permanent magnet away from the center point of the rotor core.

According to some embodiments of the present disclosure, the first magnetic isolation structure is a first internal magnetic bridge between the first end of the air groove and the first end of the first groove close to each other, or a first connection port connecting the first end of the air groove with the first end of the first groove close to each other. Alternatively or additionally, the second magnetic isolation structure is a second internal magnetic bridge between the first end of the first groove and the first end of the second groove close to each other, or a second connection port connecting the first end of the first groove with the first end of the second groove close to each other.

According to some embodiments of the present disclosure, the first magnetic isolation structure is a first internal magnetic bridge between the first end of the air groove and the first end of the first groove close to each other, and a thickness of the first internal magnetic bridge along the peripheral direction of the rotor core is equal to 4 mm, or greater than 0 mm and less than 4 mm. Alternatively or additionally, the second magnetic isolation structure is a second internal magnetic bridge between the first end of the first groove and the first end of the second groove close to each other, and a thickness of the second internal magnetic bridge along the peripheral direction of the rotor core is equal to 4 mm, or greater than 0 mm and less than 4 mm.

According to some embodiments of the present disclosure, the first groove includes a third magnetic isolation structure on a side of the first groove away from the center point of the rotor core, and the third magnetic isolation structure is a first external magnetic bridge between the second end of the first groove away from the center point of the rotor core and an outer peripheral surface of the rotor core or is a first groove opening formed on the outer peripheral surface of the rotor core by the second end of the first groove away from the center point of the rotor core, in which the second end of the first groove extends to the outer peripheral surface of the rotor core. Alternatively or additionally, the second groove includes a fourth magnetic isolation structure on a side of the second groove away from the center point of the rotor core, and the fourth magnetic isolation structure is a second external magnetic bridge between the second end of the second groove away from the center point of the rotor core and the outer peripheral surface of the rotor core or is a second groove opening formed on the outer peripheral surface of the rotor core by the second end of the second groove away from the center point of the rotor core, in which the second end of the second groove extends to the outer peripheral surface of the rotor core. Alternatively or additionally, the air groove includes a fifth magnetic isolation structure on a side of the air groove away from the center point of the rotor core, and the fifth magnetic isolation structure is a third external magnetic bridge between the second end of the air groove away from the center point of the rotor core and the outer peripheral surface of the rotor core or is a third groove opening formed on the outer peripheral surface of the rotor core by the second end of the air groove away from the center point of the rotor core, in which the second end of the air groove extends to the outer peripheral surface of the rotor core.

According to some embodiments of the present disclosure, a first external magnetic bridge is formed between the second end of the first groove away from the center point of the rotor core and an outer peripheral surface of the rotor core, and a thickness of the first external magnetic bridge along a radial direction of the rotor core is equal to 3.5 mm, or greater than 0 mm and less than 3.5 mm. Alternatively or additionally, a second external magnetic bridge is formed between the second end of the second groove away from the center point of the rotor core and the outer peripheral surface of the rotor core, and a thickness of the second external magnetic bridge along the radial direction of the rotor core is equal to 3.5 mm, or greater than 0 mm and less than 3.5 mm. Alternatively or additionally, a third external magnetic bridge is formed between the second end of the air groove away from the center point of the rotor core and the outer peripheral surface of the rotor core, and a thickness of the third external magnetic bridge along the radial direction of the rotor core is equal to 3.5 mm, or greater than 0 mm and less than 3.5 mm.

According to some embodiments of the present disclosure, the rotor core includes: a first part on a first side of the groove group close to the center point of the rotor core; and a second part on a second side of the groove group away from the center point of the rotor core. The first part and the second part are connected through a first connection section, the second part includes a third portion and a fourth portion, and the third portion is located between the first groove and the second groove, and the fourth portion is located between the air groove and the first groove in the peripheral direction of the rotor core. The third portion and the fourth portion are connected to the first part through the first connection section, and the third portion and the fourth portion are not directly connected to each other; or the third portion and the fourth portion are connected by a second connection section, and at least one of the third portion and the fourth portion are connected to the first part through the first connection section.

According to some embodiments of the present disclosure, the amount of poles of the rotor is K; a fourth magnetic isolation structure is arranged on a side of the second groove away from the center point of the rotor core, and a fifth magnetic isolation structure is arranged on a side of the air groove away from the center point of the rotor core; an angle γ formed between a line connecting a back endpoint of the fifth magnetic isolation structure to the center point of the rotor core and a line connecting an advancing endpoint of the fourth magnetic isolation structure to the center point of the rotor core, along the first rotation direction, is less than or equal to 170°/K.

According to some embodiments of the present disclosure, the first groove includes at least one first groove segment, the first permanent magnets are mounted in the at least one first groove segment, and the at least one first groove segment extends in a same direction or different directions; and the second groove includes at least one second groove segment, the second permanent magnets are mounted in the at least one second groove segment, and the at least one second groove segment extends in a same direction or different directions.

According to some embodiments of the present disclosure, the amount of the first groove segments in each first groove does not exceed three, and the amount of the second groove segments in each second groove does not exceed three.

According to some embodiments of the present disclosure, a groove wall surface of the first groove segment without the first permanent magnet mounted includes one or more kinds of flat, curved, and bent surfaces; and a groove wall surface of the second groove segment without the second permanent magnet mounted includes one or more kinds of flat, curved, and bent surfaces.

According to some embodiments of the present disclosure, the air groove includes at least one third groove segment, and a groove wall surface of the at least one third groove segment includes one or more kinds of flat, curved, and bent surfaces.

According to some embodiments of the present disclosure, the rotor includes a multilayer permanent magnet structure under a common magnetic pole, and the first permanent magnet and the second permanent magnet within the same groove group constitute one layer of the permanent magnet structure.

According to some embodiments of the present disclosure, the rotor includes: a plurality of third permanent magnets mounted in the rotor core, distributed along the peripheral direction of the rotor core, and constituting another layer of the permanent magnet structure.

According to some embodiments of the present disclosure, the third permanent magnet is arranged between the first groove and the second groove of the groove group in the peripheral direction of the rotor core, and the third permanent magnet extends perpendicular to a radial direction of the rotor core or at an angle to the radial extension of the rotor core, or forms a V-shaped permanent magnet structure.

According to some embodiments of the present disclosure, the third permanent magnet is arranged between two adjacent groove groups in the peripheral direction of the rotor core, and the third permanent magnet extends along a radial direction of the rotor core or at an angle to the radial direction of the rotor core.

According to some embodiments of the present disclosure, a third groove is arranged on side of the groove group close to the center point of the rotor core and is a V-shaped or U-shaped groove; the third permanent magnets are arranged in the third groove and formed as a V-shaped or U-shaped permanent magnet structure; and the groove group is located within an area enclosed by the V-shaped or U-shaped groove.

According to some embodiments of the present disclosure, air gap magnetic fields generated by the first permanent magnet and the second permanent magnet within a same groove group are mutually reinforced; the first permanent magnets in adjacent groove groups are magnetized in opposite directions, and the second permanent magnets in adjacent groove groups are magnetized in opposite directions.

According to some embodiments of the present disclosure, the amount M of the groove groups is equal to the amount K of poles of the rotor.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the present disclosure will become apparent and more readily appreciated from the description of embodiments with reference to the accompanying drawings, in which.

Figure 1:
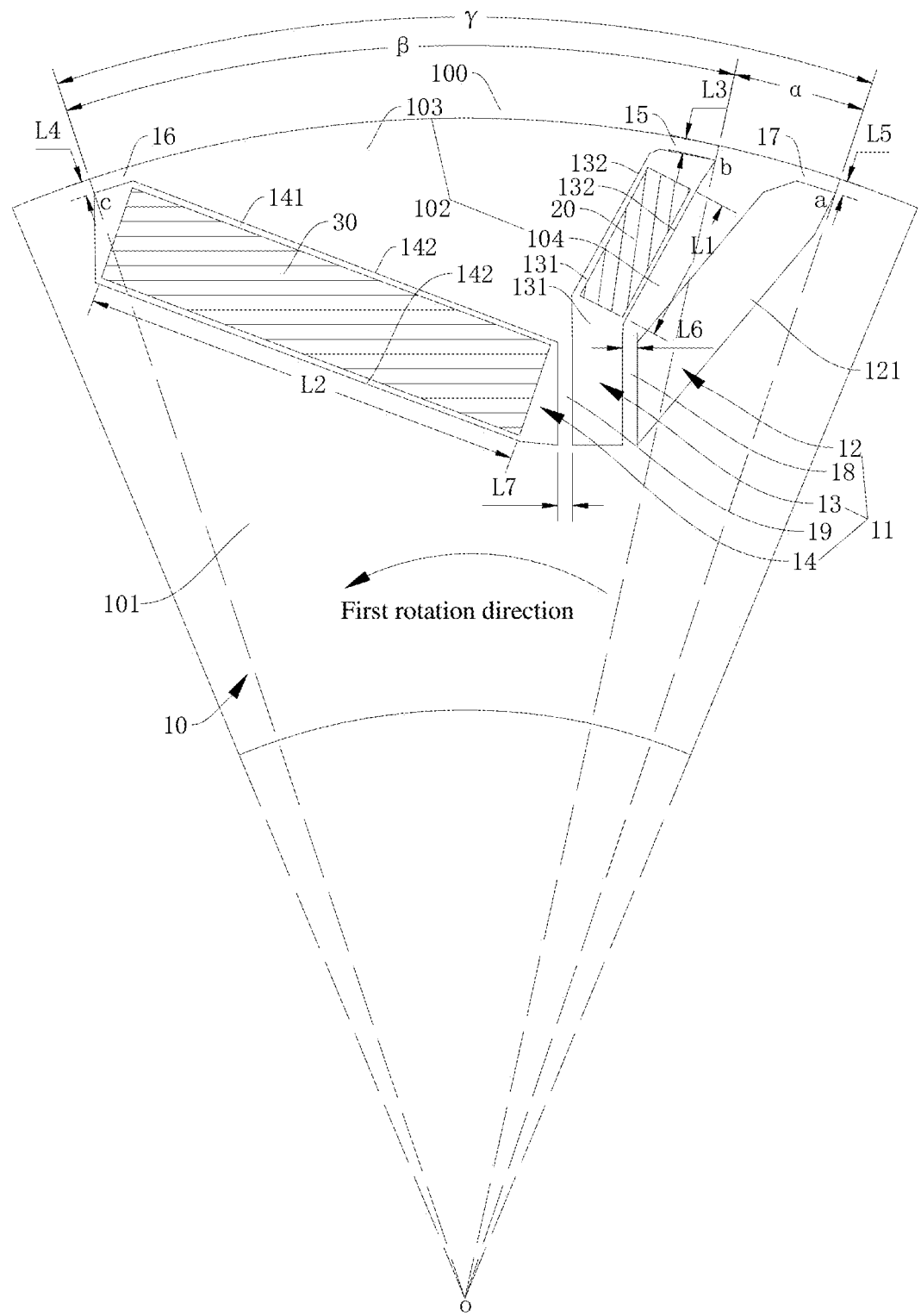
FIG. 1 is a schematic diagram of a partial structure of a rotor according to a first embodiment of the present disclosure.

REFERENCE NUMERALS rotor 100;
rotor core 10; first part 101; second part 102; third portion 103; fourth portion 104; groove group 11; air groove 12; third groove segment 121; first groove 13; first groove segment 131; first groove wall plane 132; second groove 14; second groove segment 141; second groove wall plane 142; first external magnetic bridge 15; second external magnetic bridge 16; third external magnetic bridge 17; first internal magnetic bridge 18; second internal magnetic bridge 19; third groove 41;
first permanent magnet 20;
second permanent magnet 30;
third permanent magnet 40.

DETAILED DESCRIPTION OF EMBODIMENTS

Embodiments of the present disclosure will be described in detail below, and examples of the embodiments will be shown in the accompanying drawings. The same or similar elements and the elements having same or similar functions are denoted by like reference numerals throughout the descriptions. The embodiments described below are exemplary and are intended to explain the present disclosure rather than limit the present disclosure.

In the specification, it is to be understood that terms such as "central," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," "circumferential" and the like should be construed to refer to the orientation as then described or as shown in the drawings under discussion. These relative terms are for convenience of description and do not indicate or imply that the device or element referred to must have a particular orientation or be constructed and operated in a particular orientation. Thus, these terms shall not be construed to limit the present disclosure. In the specification, the feature defined with "first" and "second" may include one or more of this feature, and the term "a plurality of" means two or more than two.

With the development of traditional industries and the emergence of new industries, the demand for all aspects of motor characteristics in modern industry is increasing, and the applications of high-performance permanent magnet motors are expanding, along with significantly improved techno-economic indexes. In the field of transportation electrification, such as electric vehicles, electric aircrafts, electric yachts, motors with interior permanent magnets are widely used due to their high torque/power density, high efficiency, wide speed range and high reliability.

In order to increase the torque/power density of motors, designers usually use high-performance permanent magnets, increase the volume of permanent magnets and adopt other technical means to improve the design, although the marginal benefit of improving the performance and volume of permanent magnets decreases gradually. However, the high-performance permanent magnet materials, such as rare earth, are expensive and the risk of environmental pollution during mining and processing has also restricted their applications.

To reduce the use of permanent magnet materials, utilizing and increasing the reluctance torque becomes an important method to improve the torque density of the motors with interior permanent magnets. By increasing the amount of permanent magnet layers and optimizing the structures of permanent magnet grooves and flux barriers, the reluctance torque can be substantially increased, thus improving the torque density of the motors. Such motors are also known as permanent magnet-assisted synchronous reluctance motors. However, permanent magnet-assisted synchronous reluctance motors have the disadvantages of complex structure and large amount of permanent magnet blocks, which results in many issues for design optimization and industrial applications.

In the related art, the interior permanent magnet motors mainly adopt a symmetrical rotor structure, with an electric degree difference of not less than 45 degrees between a peak point of a permanent magnet torque and a peak point of a reluctance torque. This characteristic causes the utilization rates of both the reluctance torque and the permanent magnet torque to be reduced to some extent at a peak point of a combined torque. In addition, the conventional interior permanent magnet motors suffer from large permanent magnetic flux leakage and low material utilization and are also affected by factors such as core saturation.

Therefore, the present disclosure proposes a special asymmetric rotor 100, and the rotor 100 according to certain embodiments of the present disclosure can significantly reduce the angular difference between the peak point of the permanent magnet torque and that of the reluctance torque, increase the utilization rates of both torque components (the reluctance torque and the permanent magnet torque) at a maximum torque point, and improve the maximum torque and torque density of the motor.

The rotor 100 for the motor according to certain embodiments of the present disclosure will be described below with reference to the accompanying drawings.

Referring to FIG. 1, the rotor 100 according to an embodiment of the present disclosure includes: a rotor core 10, a plurality of first permanent magnets 20, and a plurality of second permanent magnets 30.

The rotor core 10 is provided with a plurality of groove groups 11 distributed along a peripheral direction of the rotor core 10, and each groove group 11 includes an air groove 12, a first groove 13, and a second groove 14. Respective first ends, near a center point of the rotor core 10, of the air groove 12, the first groove 13, and the second groove 14 are close to one another, and respective second ends, away from the center point of the rotor core 10, of the air groove 12, the first groove 13, and the second groove 14 are away from one another. A first magnetic isolation structure is arranged between the first end of the air groove 12 and the first end of the first groove 13 that are close to each other. The first magnetic isolation structure plays a role in magnetic isolation, and main magnetic flux (i.e., the magnetic flux except for leakage) does not pass between the first end of the air groove 12 and the first end of the first groove 13 that are close to each other. A second magnetic isolation structure is arranged between the first end of the first groove 13 and the first end of the second groove 14 that are close to each other. The second magnetic isolation structure plays a role in magnetic isolation, and the main magnetic flux does not pass between the first end of the first groove 13 and the first end of the second groove 14 that are close to each other. In the embodiment of the present disclosure, the first magnetic isolation structure and the second magnetic isolation structure may be magnetic bridges or connection ports between two grooves, as long as they meet the requirement for magnetic isolation.

Moreover, the second ends of the air groove 12, the first groove 13 and the second groove 14 that are away from the center point of the rotor core 10 are distributed along a first rotation direction of the rotor 100. In other words, the air groove 12, the first groove 13, and the second groove 14 are arranged in sequence along the first rotation direction at an end of the groove group 11 away from the rotor core 10. The first permanent magnet 20 is mounted in the first groove 13, and the second permanent magnet 30 is mounted in the second groove 14.

With the above structure, each groove group 11 forms a trident-like rotor groove structure, in which the first permanent magnet 20 and the second permanent magnet 30 are ahead of the air groove 12, and the first permanent magnet 20 is ahead of the second permanent magnet 30. Thus, the whole groove group 11 and the first permanent magnet 20 and the second permanent magnet arranged in the groove group 11, together, form an asymmetric structure. Thus, the whole rotor 100 forms an asymmetric rotor structure, i.e., an asymmetric structure with respect to a radial direction of the rotor 100.

In the interior permanent magnet motors, the torque can be considered as a synthesis of two parts, namely, the permanent magnet torque and the reluctance torque. A magnetic path of a permanent magnetic field generated by one pole of the permanent magnet passes through the permanent magnet, a rotor core, an air gap and a stator core, and closes with a magnetic path of a permanent magnetic field generated by an adjacent pole of the permanent magnet to form a rotating permanent magnetic field that is stationary with respect to the rotor but rotating with respect to the stator. A multiphase winding of the stator is fed with AC current to form a stator rotating magnetic field. A torque generated by the interaction between the stator and the permanent magnetic field that drives the rotor to rotate is a permanent magnetic torque. The permanent magnet torque peaks when an axis of the stator rotating magnetic field differs from an axis of the permanent magnetic field by an electric degree of 90 degrees, i.e., when a current advancing angle is an electric degree of 0 degrees. The reluctance torque is generated by alternation of magnetic conductance of the rotor, which makes inductance on a cross axis and a direct axis of the rotor different. The reluctance torque peaks when the current advancing angle is an electric degree of 45 degrees, without considering saturation and other nonlinear factors. In such a case, the axis of the permanent magnetic field coincides with an axis of a d-axis of the reluctance, which is an axis of a maximum point of the reluctance.

Through the asymmetric structure of the rotor 100 described above, the angular difference between the current advancing angle corresponding to the peak point of the permanent magnet torque and the current advancing angle corresponding to the peak point of the reluctance torque can be reduced. The asymmetric structure of the rotor 100 is designed so that the axis of the permanent magnetic field deviates from and overtakes the axis of the d-axis of the reluctance (i.e., the maximum point of the reluctance) along the first rotation direction, and the current corresponding to the peak point of the permanent magnet torque is increased by the advancing angle and approximates to the current advancing angle corresponding to the peak point of the reluctance torque, thereby increasing a peak value of the combined torque of the motor. In other words, by providing the above asymmetric structure of the rotor 100, the present disclosure improves the utilization rates of the permanent magnet torque component and the reluctance torque component at the maximum torque point of the motor without increasing the amount of permanent magnet material, i.e., the ratios of values of the permanent magnet torque component and the reluctance torque component at the maximum torque point to the peak values of both.

The rotor 100 according to certain embodiments of the present disclosure will be described below in conjunction with specific examples and contrast examples.

Example 1: a rotor 100 for a motor according to a first embodiment of the present disclosure is as shown in FIG. 1.

Figure 2:
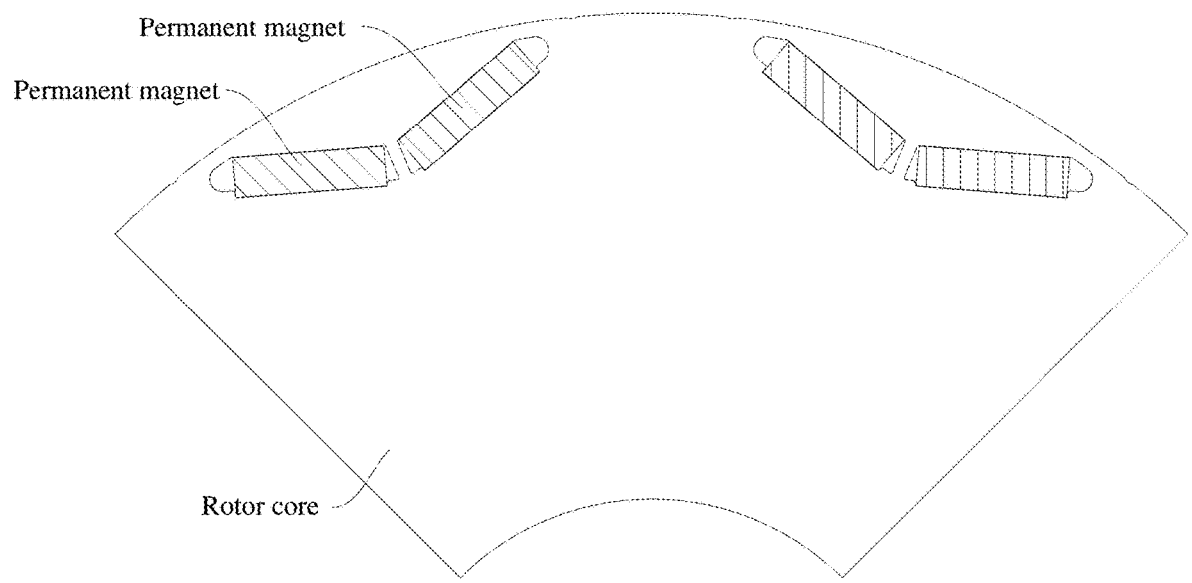
FIG. 2 is a schematic diagram of a partial structure of a symmetrical V-shaped rotor for a motor with an interior permanent magnet in the related art.

Contrast example 1: a V-shaped rotor of an interior permanent magnet motor for a mature electric vehicle is as shown in FIG. 2.

Contrast example 2: the difference from Example 1 is that the second end of the first groove 13, the second end of the air groove 12, and the second end of the second groove 14, which are away from the center point of the rotor core 10, are arranged in sequence along the first rotation direction of the rotor 100.

With the same stator design, rotor inner and outer diameters, the same amount of permanent magnets, and same current and voltage amplitude limitations, Example 1 can increase the maximum torque by nearly 10% compared to Contrast example 1 and by nearly 5% compared to Contrast example 2. The torque pulsation at the maximum torque point is 11.2% for Example 1, 13.4% for Contrast example 1, and 14.5% for Contrast example 2, respectively.

It can be seen that the rotor 100 of the motor according to the embodiment of the present disclosure can significantly increase the maximum torque of the motor, reduce the torque pulsation, and improve the operational stability of the motor.

Figure 3:
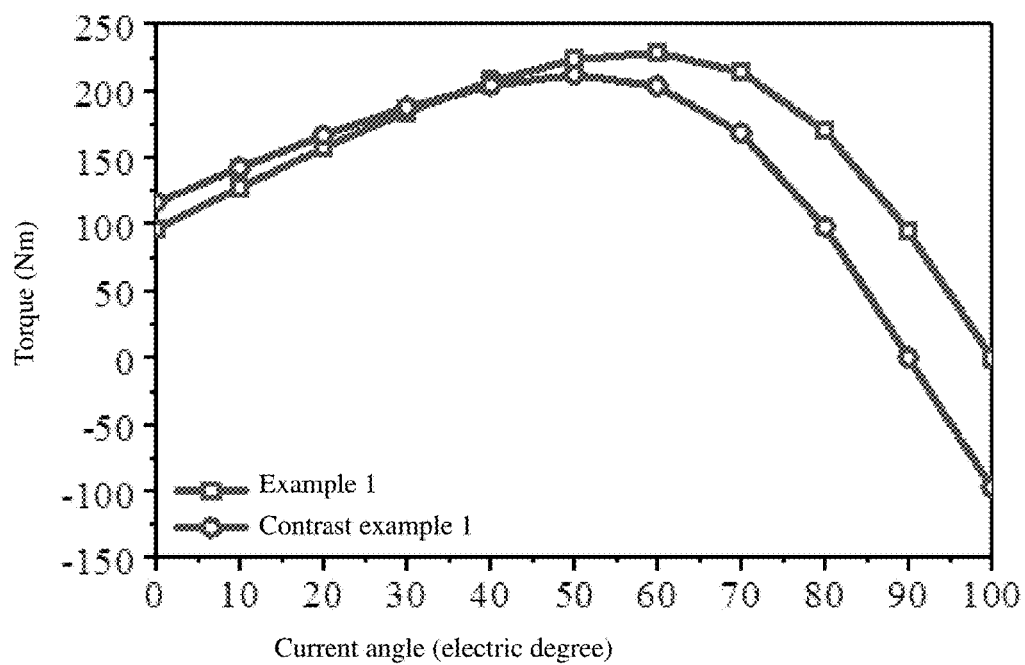
FIG. 3 is a graph illustrating a maximum torque of the rotor in FIGS. 1 and 2.
Figure 4:
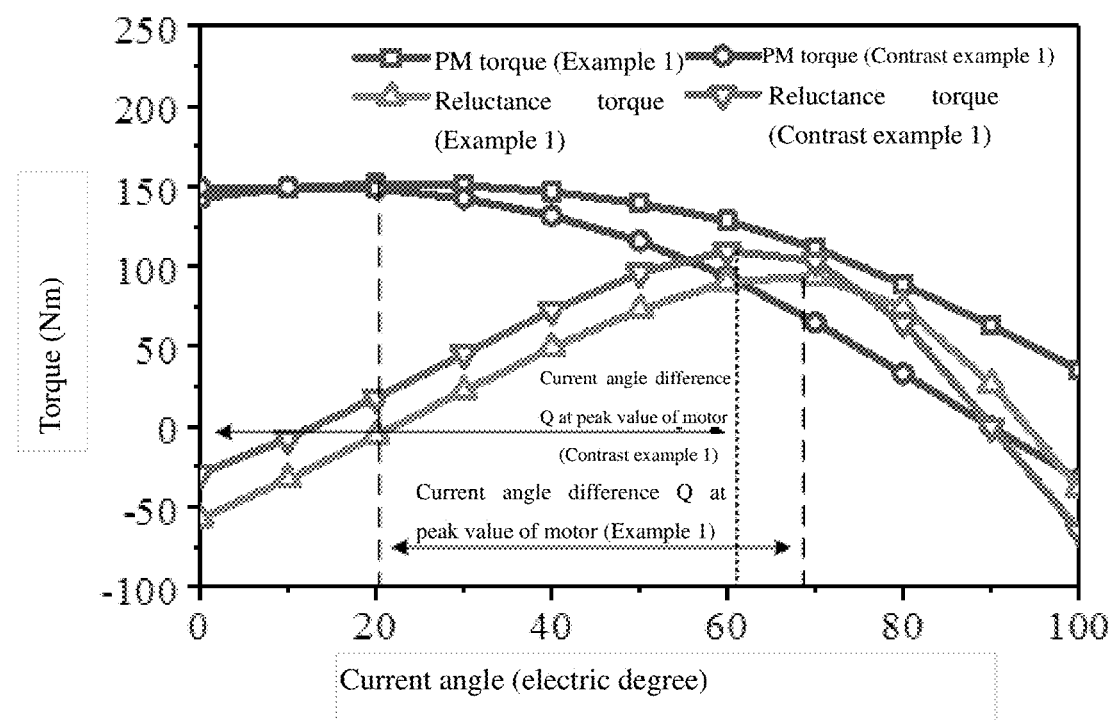
FIG. 4 is a graph illustrating a permanent magnet torque and a reluctance torque of the rotor in FIGS. 1 and 2.

FIG. 3 is a graph illustrating the maximum torques of Example 1 and Contrast example 1. It shows that the maximum torque of Example 1 exceeds that of Contrast example 1. To further illustrate and verify the mechanism of torque enhancement, FIG. 4 illustrates a contrast between the permanent magnet torque component and the reluctance torque component. It can be clearly seen that the magnitudes of the permanent magnet torque components in Example 1 and Contrast example 1 are substantially equal, and the magnitude of the reluctance torque component in Contrast example 1 exceeds that in Example 1. However, the current angle difference P between the maximum permanent magnet torque and the reluctance torque of Example 1 is reduced compared to the current angle difference Q between the maximum permanent magnet torque and the reluctance torque of Contrast example 1, resulting in a boost in the combined torque of Example 1.

Table 1 further provides simulation result data of Example 1 and Contrast example 1. It can be seen that, the utilization rates of both the permanent magnet torque and the reluctance torque at the maximum torque point of the motor of Example 1 is considerably improved compared to that of Contrast example 1.

TABLE 1

| Performance | Example 1 | Contrast example 1 |
| --- | --- | --- |
| Maximum torque (Nm) | 230.2 | 211.8 |
| Maximum PM torque (Nm)/ Utilization ratio kpm | 153/89.2% | 150/77.1% |
| Maximum reluctance torque (Nm)/ Utilization ratio kr | 98/95.7% | 113/84.9% |

TABLE 1-continued

| Performance | Example 1 | Contrast example 1 |
| --- | --- | --- |
| Reluctance torque ratio Treluc/ Tmax when maximum torque | 41% | 45.4% |
| Current angle difference (Electric degree/ED) | 45 | 60 |

In conclusion, the arrangement sequence of the air groove 12, the first groove 13, and the second groove 14, and the positions of the first permanent magnet 20 and the second permanent magnet 30 may affect both the difference between the current advancing angles corresponding to the peak points of the permanent magnet torque and the reluctance torque, and the utilization rates of the permanent magnet torque component and the reluctance torque component at the maximum torque point. For the rotor 100 according to certain embodiments of the present disclosure, the asymmetric structure of the rotor 100 significantly reduces the difference between the current advancing angles corresponding to the peak points of the permanent magnet torque and the reluctance torque, with the same amount of permanent magnets and the same inner and outer diameter of the rotor, thereby enhancing the maximum torque of the motor, improving the utilization rates of the permanent magnet torque component and the reluctance torque component at the maximum torque point, thereby contributing to the improvement on the power density of the motor and the reduction in the permanent magnetic flux leakage. As a result, the material utilization rate is improved, and the amount of permanent magnets and production costs is decreased.

It should be noted that in the embodiments of the present disclosure, the "first rotation direction" can be understood as a rotation direction of the rotor 100 around an axis in a main working state of the motor during actual operation. For example, in certain embodiments where the motor is used in a vehicle, the main working state may be a state in which the vehicle is driving forwards. In some embodiments, the rotor 100 may also have a second rotation direction opposite to the first rotation direction, which may be, for example, a rotation direction of the rotor 100 when the vehicle is a reversing state.

Figure 5:
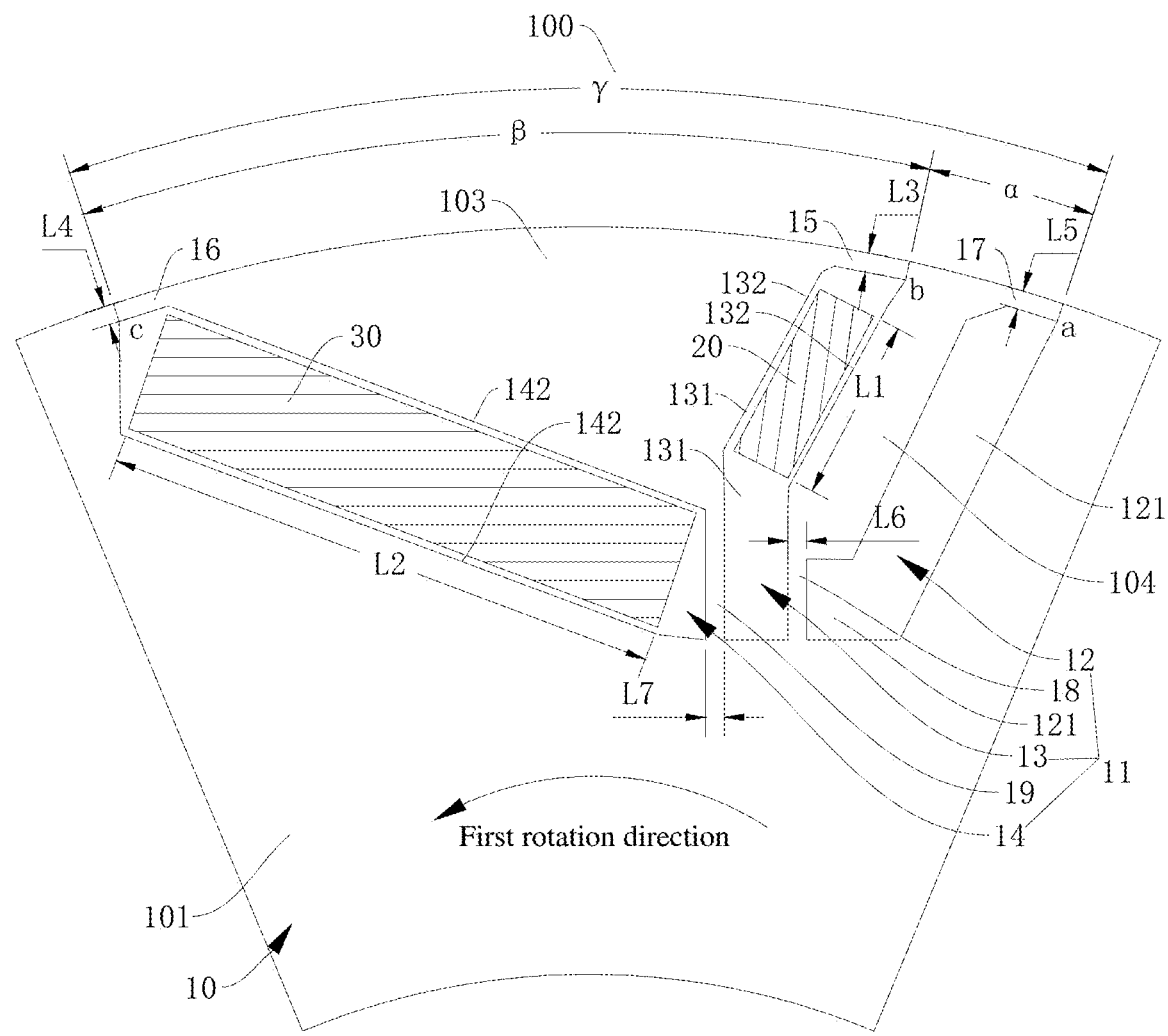
FIG. 5 is a schematic diagram of a partial structure of a rotor according to a second embodiment of the present disclosure.
Figure 6:
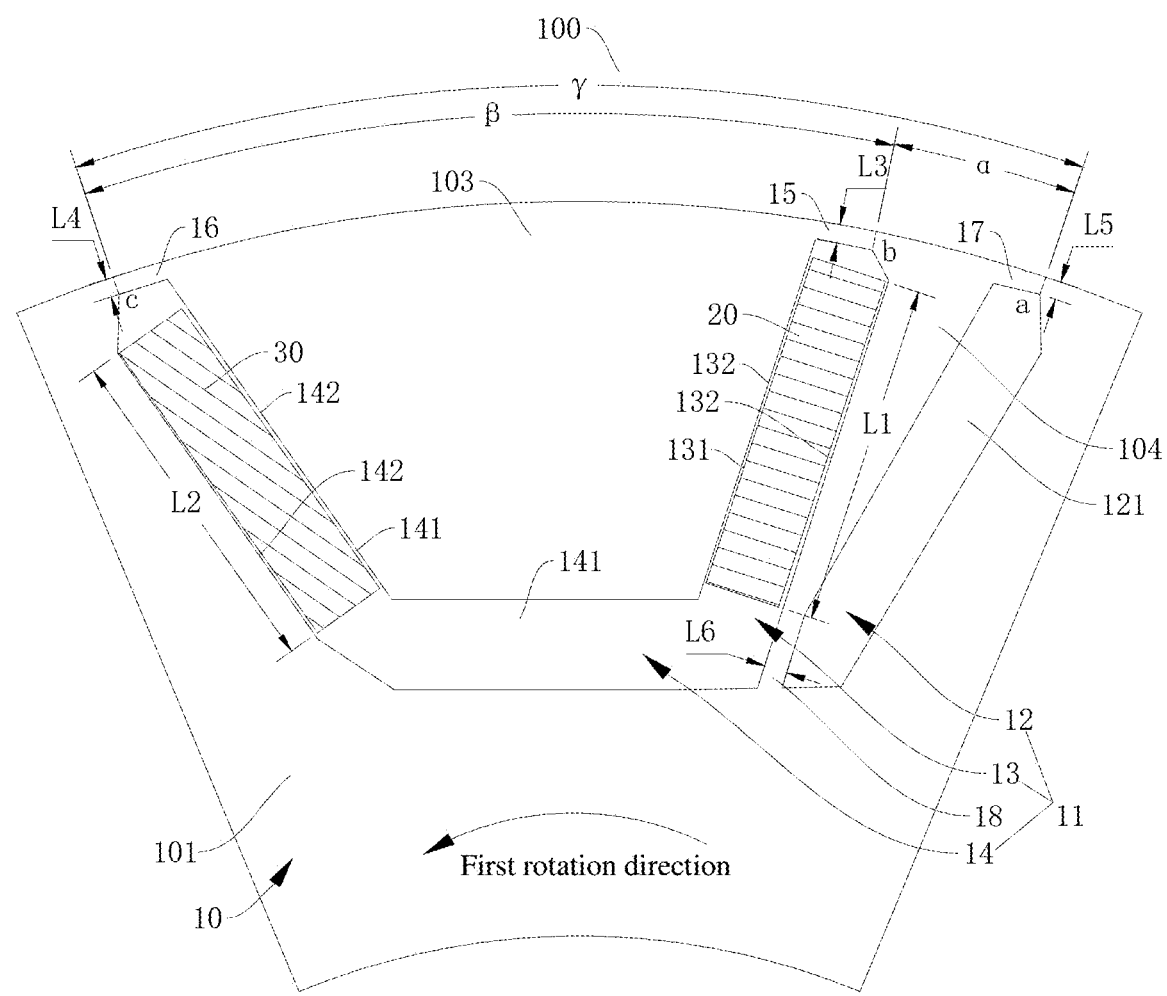
FIG. 6 is a schematic diagram of a partial structure of a rotor according to a third embodiment of the present disclosure.

According to some embodiments of the present disclosure, as shown in FIG. 1, FIG. 5 and FIG. 6, the first groove 13 is provided with a third magnetic isolation structure on its side away from the center point of the rotor core 10, the second groove 14 is provided with a fourth magnetic isolation structure on its side away from the center point of the rotor core 10, and the air groove 12 is provided with a fifth magnetic isolation structure on its side away from the center point of the rotor core 10.

In the embodiments of the present disclosure, the third magnetic isolation structure, the fourth magnetic isolation structure and the fifth magnetic isolation structure may be magnetic bridges or groove openings (the first groove 13, the second groove 14 or the air groove 12) formed on an outer peripheral surface of the rotor core 10, as long as the requirement for magnetic isolation can be satisfied.

Along the first rotation direction, an angle of α is formed between a line connecting a back endpoint of the third magnetic isolation structure to the center point of the rotor core 10 and a line connecting a back endpoint of the fifth magnetic isolation structure to the center point of the rotor core 10; and an angle of β is formed between the line connecting the back endpoint of the third magnetic isolation structure to the center point of the rotor core 10 and a line connecting an advancing endpoint of the fourth magnetic isolation structure to the center point of the rotor core 10, in which α is less than β.

As for the third magnetic isolation structure, in an embodiment where the third magnetic isolation structure is a magnetic bridge, a back endpoint of the third magnetic isolation structure is an endpoint of the magnetic bridge against the first rotation direction, and an advancing endpoint of the third magnetic isolation structure is an endpoint of the magnetic bridge following the first rotation direction; in an embodiment where the third magnetic isolation structure is a groove opening, a back endpoint of the third magnetic isolation structure is an endpoint of the groove opening against the first rotation direction, and an advancing endpoint of the third magnetic isolation structure is an endpoint of the groove opening following the first rotation direction. According to the above description, the advancing and back endpoints of the fourth magnetic isolation structure and the fifth magnetic isolation structure are understandable.

In other words, as shown in FIG. 1, the center point of the rotor core 10 is denoted as o; along the first rotation direction, the back endpoint of the fifth magnetic isolation structure is a, the back endpoint of the third magnetic isolation structure is b, and the advancing endpoint of the fourth magnetic isolation structure is c. A straight line segment connecting the center point o with the back endpoint a is denoted as oa, a straight line segment connecting the center point o with the back endpoint b is ob, and a straight line segment connecting the center point o with the advancing endpoint c is oc. An angle between the straight line segment oa and the straight line segment ob is α, and an angle between the straight line segment ob and the straight line segment oc is β, in which α is less than β.

Since α is less than β, an interval between the first groove 13 and the air groove 12 is smaller than an interval between the first groove 13 and the second groove 14 in a peripheral direction of the rotor 100 to improve the asymmetry of the groove group 11. As a result, an axis of the permanent magnetic field generated by the second permanent magnet 30 in the second groove 14 and an axis of the permanent magnetic field generated by the first permanent magnet 20 in the first groove 13 deviate from and overtake the axis of the d-axis of the reluctance to a greater extent, and the difference between the current advancing angle at the peak point of the permanent magnet torque and the current advancing angle at the peak point of the reluctance torque becomes smaller, to further increase the peak value of the combined torque.

In some embodiments of the present disclosure, referring to FIGS. 1, 5 and 6, the amount of poles of the rotor 100 is K, and along the first rotation direction, an angle of γ is formed between the line connecting the back endpoint of the fifth magnetic isolation structure to the center point of the rotor core 10 and the line connecting the advancing endpoint of the fourth magnetic isolation structure to the center point of the rotor core 10, in which γ is less than or equal to 170°/K. In an embodiment of the present disclosure, γ=α+β. In other words, the straight line segment oa and the straight line segment oc form an angle γ (γ≤170°/K), i.e., α+β≤170°/K. For example, in some exemplary embodiments, γ may be 165°/K, 160°/K, 155°/K, or 150°/K, etc. In order to prevent a span of each groove group 11 in the peripheral direction of the rotor 100 from being overly large, resulting in poor mechanical strength of the rotor core 10 due to a small interval between two adjacent groove groups 11, the above dimensional range can satisfy the requirements of high torque, high efficiency and wide range of speed regulation of the magnetic field generated by the rotor 100, and ensure the structural strength of the rotor core 10 to meet the requirement for high reliability of the rotor 100.

According to some embodiments of the present disclosure, as shown in FIGS. 1, 5 and 6, an interval L1 between a first end of the first permanent magnet 20 near the center point of the rotor core 10 and a second end of the first permanent magnet 20 away from the center point of the rotor core 10 is less than or equal to an interval L2 between a first end of the second permanent magnet near the center point of the rotor core 10 and a second end of the second permanent magnet 30 away from the center point of the rotor core 10, i.e., L1≤L2. The permanent magnets in the first groove 13 and the second groove 14 form an asymmetric permanent magnet structure, and the first permanent magnet 20 in an advancing position has a greater length along the first rotation direction. Even if the effect of the air groove 12 is ignored, the asymmetric permanent magnet structure of the first permanent magnet 20 and the second permanent magnet 30 can still reduce the difference between the current advancing angle at the peak point of the permanent magnet torque and the current advancing angle at the peak point of the reluctance torque. The asymmetric permanent magnet structure in cooperation with the air groove 12 can better increase the peak value of the combined torque and the utilization rates of the permanent magnet torque component and the reluctance torque component.

According to some embodiments of the present disclosure, an air gap is formed between an outer peripheral surface of the rotor 100 and the stator core, and respective outer ends of the air groove 12, the first groove 13 and the second groove 14, i.e., the ends away from the center point of the rotor core 10, may be spaced apart from the air gap by magnetic bridges or may be in direct communication with the air gap, to effectively reduce the magnetic flux leakage at the ends and improve the material utilization rate.

In some embodiments, as shown in FIG. 1, the third magnetic isolation structure described above may be a first external magnetic bridge 15 between the second end of the first groove 13 away from the center point of the rotor core 10 and the outer peripheral surface of the rotor core 10, and the first external magnetic bridge 15 can reduce the magnetic flux leakage while ensuring the structural strength of the rotor core 10. Alternatively, in other embodiments, the second end of the first groove 13 away from the center point of the rotor core 10 extends to the outer peripheral surface of the rotor core 10, and the third magnetic isolation structure described above may be a first groove opening formed by the first groove 13 on the outer peripheral surface of the rotor core 10, which can also significantly reduce the magnetic flux leakage.

In some embodiments, as shown in FIG. 1, the fourth magnetic isolation structure described above may be a second external magnetic bridge 16 between the second end of the second groove 14 away from the center point of the rotor core 10 and the outer peripheral surface of the rotor core 10, and the second external magnetic bridge 16 can reduce the magnetic flux leakage while ensuring the structural strength of the rotor core 10. Alternatively, in other embodiments, the second end of the second groove 14 away from the center point of the rotor core 10 extends to the outer peripheral surface of the rotor core 10, and the fourth magnetic isolation structure described above may be a second groove opening formed by the second groove 14 on the outer peripheral surface of the rotor core 10, which can also significantly reduce the magnetic flux leakage.

In some embodiments, as shown in FIG. 1, the fifth magnetic isolation structure described above may be a third external magnetic bridge 17 between the second end of the air groove 12 away from the center point of the rotor core 10 and the outer peripheral surface of the rotor core 10, and the third external magnetic bridge 17 can reduce the magnetic flux leakage while ensuring the structural strength of the rotor core 10. Alternatively, in other embodiments, the second end of the air groove 12 away from the center point of the rotor core 10 extends to the outer peripheral surface of the rotor core 10, and the fifth magnetic isolation structure described above may be a third groove opening formed by the air groove 12 on the outer peripheral surface of the rotor core 10, which can also significantly reduce the magnetic flux leakage.

Additionally, in an embodiment with the first external magnetic bridge 15, as shown in FIG. 1, a thickness L3 of the first external magnetic bridge 15 along a radial direction of the rotor core 10 is equal to 3.5 mm, or greater than 0 mm and less than 3.5 mm, i.e., 0 mm<L3≤3.5 mm. For example, in some exemplary embodiments, L3 may be 0.5 mm, 1 mm, 1.5 mm, 2 mm, 3 mm, 3.5 mm, and etc. If the thickness L3 of the first external magnetic bridge 15 is overly large, the effect of reducing magnetic flux leakage will be diminished; if the thickness L3 of the first external magnetic bridge 15 is overly small, the mechanical strength of the rotor core 10 will be weakened. Within the above dimensional range, the requirements of reducing the magnetic flux leakage and ensuring the mechanical strength can be simultaneously accommodated, and the structural design is more reasonable.

In an embodiment with the second external magnetic bridge 16, as shown in FIG. 1, a thickness L4 of the second external magnetic bridge 16 along the radial direction of the rotor core is equal to 3.5 mm, or greater than 0 mm and less than 3.5 mm, i.e., 0 mm<L3≤3.5 mm. For example, in some exemplary embodiments, L4 may be 0.5 mm, 1 mm, 1.5 mm, 2 mm, 3 mm, 3.5 mm, and etc. If the thickness L4 of the second external magnetic bridge 16 is overly large, the effect of reducing magnetic flux leakage will be diminished; if the thickness L4 of the second external magnetic bridge 16 is overly small, the mechanical strength of the rotor core 10 will be weakened. Within the above dimensional range, the requirements of reducing the magnetic flux leakage and ensuring the mechanical strength can be simultaneously accommodated, and the structural design is more reasonable.

In an embodiment with the third external magnetic bridge 17, as shown in FIG. 1, a thickness L5 of the third external magnetic bridge 17 along the radial direction of the rotor core 10 is equal to 3.5 mm, or greater than 0 mm and less than 3.5 mm, i.e., 0 mm<L3≤3.5 mm. For example, in some exemplary embodiments, L5 may be 0.5 mm, 1 mm, 1.5 mm, 2 mm, 3 mm, 3.5 mm, and etc. If the thickness L5 of the third external magnetic bridge 17 is overly large, the effect of reducing magnetic flux leakage will be diminished; if the thickness L5 of the third external magnetic bridge 17 is overly small, the mechanical strength of the rotor core 10 will be weakened. Within the above dimensional range, the requirements of reducing the magnetic flux leakage and ensuring the mechanical strength can be simultaneously accommodated, and the structural design is more reasonable.

In addition, referring to FIG. 1, the first magnetic isolation structure may be a first internal magnetic bridge 18 between the first end of the air groove 12 and the first end of the first groove 13 close to each other, or may be a first connection port connecting the first end of the air groove 12 with the first end of the first groove 13 close to each other. The second magnetic isolation structure may be a second internal magnetic bridge 19 between the first end of the first groove 13 and the first end of the second groove 14 close to each other, or may be a second connection port connecting the first end of the first groove 13 with the first end of the second groove 14 close to each other, thereby reducing the magnetic flux leakage at the ends.

Moreover, the end of the air groove 12 is close to the end of the first groove 13, and the end of the first groove 13 is close to the end of the second groove 14, such that the air groove 12, the first groove 13 and the second groove 14 may be regarded as extending from a same internal position of the rotor core 10 towards the outer peripheral surface of the rotor core 10, and a resulting trident-like structure enables the current advancing angle corresponding to the peak point of the permanent magnet torque to increase and approximate to the current advancing angle corresponding to the peak point of the reluctance torque, thereby improving the peak value of the combined torque.

As shown in FIG. 1, in an embodiment with the first internal magnetic bridge 18 as the first magnetic isolation structure, a thickness L6 of the first internal magnetic bridge 18 along the peripheral direction of the rotor core 10 is equal to 4 mm, or greater than 0 mm and less than 4 mm, i.e., 0 mm<L6≤4 mm. For example, in some exemplary embodiments, L6 may be 0.5 mm, 1 mm, 1.5 mm, 2 mm, 3 mm, 3.5 mm, 4 mm, and etc. If the thickness L6 of the first internal magnetic bridge 18 is overly large, the effect of reducing magnetic flux leakage will be diminished, and the deviation of the axis of the permanent magnetic field along the first rotation direction will be affected. If the thickness L6 of the first internal magnetic bridge 18 is overly small, the mechanical strength of the rotor core 10 will be weakened. Within the above dimensional range, the requirements of reducing the magnetic flux leakage, improving the peak value of the combined torque, and ensuring the mechanical strength can be simultaneously accommodated, and the structural design is more reasonable.

As shown in FIG. 1, in an embodiment with the second internal magnetic bridge 19 as the second magnetic isolation structure, a thickness L7 of the second internal magnetic bridge 19 along the peripheral direction of the rotor core 10 is equal to 4 mm, or greater than 0 mm and less than 4 mm, i.e., 0 mm<L6≤4 mm. For example, in some exemplary embodiments, L7 may be 0.5 mm, 1 mm, 1.5 mm, 2 mm, 3 mm, 3.5 mm, 4 mm, and etc. If the thickness L7 of the second internal magnetic bridge 19 is overly large, the effect of reducing magnetic flux leakage will be diminished, and the deviation of the axis of the permanent magnetic field along the first rotation direction will be affected. If the thickness L7 of the second internal magnetic bridge 19 is overly small, the mechanical strength of the rotor core 10 will be weakened. Within the above dimensional range, the requirements of reducing the magnetic flux leakage, improving the peak value of the combined torque, and ensuring the mechanical strength can be simultaneously accommodated, and the structural design is more reasonable.

In certain embodiments of the present disclosure, as shown in FIG. 1, the rotor core 10 includes a first part 101 and a second part 102. The first part 101 is located on a first side of the groove group 11 close to the center point of the rotor core 10, and the second part 102 is located on a second side of the groove group 11 away from the center point of the rotor core 10. The first part 101 and the second part 102 are connected by a first connection section, and the rotor core 10 is connected as a whole to ensure the structural reliability of the rotor core 10 and to improve the stability of fixation of the first permanent magnet 20 and the second permanent magnet 30 to the rotor core 10.

Further, referring to FIG. 1, the second part 102 includes a third portion 103 and a fourth portion 104. In the peripheral direction of the rotor core 10, the third portion 103 is located between the first groove 13 and the second groove 14, and the fourth portion 104 is located between the air groove 12 and the first groove 13. In some embodiments, both the third portion 103 and the fourth portion 104 are connected to the first part 101 by the first connection section, and the third portion 103 and the fourth portion 104 are not directly connected to each other, in which way the first part 101 and the second part 102 are connected. In other embodiments, the third portion 103 and the fourth portion 104 are connected by a second connection section, and at least one of the third portion 103 and the fourth portion 104 are connected to the first part 101 by the first connection section to achieve the connection of the first part 101 and the second part 102.

In some embodiments of the present disclosure, the first connection section may include the second external magnetic bridge 16, the third external magnetic bridge 17, the first internal magnetic bridge 18, and the second internal magnetic bridge 19; and the second connection section may be the first external magnetic bridge 15. In an embodiment with the first external magnetic bridge 15, the rotor core 10 may be provided with at least one of the second external magnetic bridge 16, the third external magnetic bridge 17, the first internal magnetic bridge 18, and the second internal magnetic bridge 19. In an embodiment without the first external magnetic bridge 15, that is, the third magnetic isolation structure is configured as the first groove opening, the rotor core 10 is provided with at least one of the second external magnetic bridge 16 and the second internal magnetic bridge 19 and at least one of the third external magnetic bridge 17 and the first internal magnetic bridge 18.

For example, in some exemplary embodiments, the rotor core 10 may be provided with the first external magnetic bridge 15 and the second external magnetic bridge 16, or may be provided with the first external magnetic bridge 15 and the third external magnetic bridge 17, or may be provided with the first external magnetic bridge 15 and the first internal magnetic bridge 18, or may be provided with the first external magnetic bridge 15 and the second internal magnetic bridge 19, or may be provided with the second external magnetic bridge 16 and the third external magnetic bridge 17, or may be provided with the second external magnetic bridge 16 and the second internal magnetic bridge 19, or may be provided with the third external magnetic bridge 17 and the first internal magnetic bridge 18, or may be provided with the first internal magnetic bridge 18 and the second internal magnetic bridge 19.

For example, in some exemplary embodiments, the rotor core 10 may be provided with any three of the first external magnetic bridge 15, the second external magnetic bridge 16, the third external magnetic bridge 17, the first internal magnetic bridge 18, and the second internal magnetic bridge 19. For example, in some exemplary embodiments, the rotor core 10 may be provided with any four of the first external magnetic bridge 15, the second external magnetic bridge 16, the third external magnetic bridge 17, the first internal magnetic bridge 18, and the second internal magnetic bridge 19. For example, in some exemplary embodiments, the rotor core may be provided with all of the first external magnetic bridge 15, the second external magnetic bridge 16, the third external magnetic bridge 17, the first internal magnetic bridge 18, and the second internal magnetic bridge 19. All of these embodiments fall into the protection scope of the present disclosure.

In some embodiments of the present disclosure, specific extension structures of the first groove 13, the second groove 14, and the air groove 12 may be set flexibly according to actual situations.

In some embodiments, as shown in FIG. 6, the first groove 13 may include a first groove segment 131 in which at least one first permanent magnet 20 is arranged. In other embodiments, as shown in FIGS. 1 and 5, the first groove 13 may include a plurality of first groove segments 131, and at least one of the first groove segments 131 is provided with at least one first permanent magnet 20, that is, one of the first groove segments 131 is provided with at least one first permanent magnet 20, or each of the first groove segments 131 is provided with at least one first permanent magnet 20. The plurality of first groove segments 131 extend in the same direction or different directions. The first groove segments 131 which do not have any first permanent magnet are formed as air segments. In other words, the amount of the first groove segments 131 included by the first groove 13 is denoted as A; the amount of the first groove segments 131, which have the first permanent magnet 20 mounted therein, among the A first groove segments 131 is denoted as B; and the amount of the first groove segments 131, which do not have any first permanent magnet 20 mounted therein, among the A first groove segments 131 is denoted as C, in which $A=B+C$, and $A \geq 1$, $B \geq 1$, and $C \geq 0$.

In examples shown in FIGS. 1 and 5, the first groove 13 includes two first groove segments 131 that are in communication with each other and extend in different directions. One of the first groove segments 131 close to the outer peripheral surface of the rotor core 10 is provided with the first permanent magnet 20, and the first permanent magnet 20 is closer to the outer peripheral surface of the rotor core 10, which is conducive to increasing an electromagnetic torque. The other of the first groove segments 131 close to the center point of the rotor core 10 can reduce the magnetic flux leakage at the end of the first permanent magnet 20, which is conducive to improving the utilization rate of the first permanent magnet 20.

It should be noted that in certain embodiments of the present disclosure, the amount of the first groove segments 131 in each first groove 13 does not exceed three, i.e., $A \leq 3$. The simple structure of the first groove 13 is conducive to reducing the difficulty of the machining process, easy to design and process, and conducive to simplifying the structure of the first permanent magnet 20 within the first groove 13.

In some embodiments, as shown in FIGS. 1 and 5, the second groove 14 may include a second groove segment 141, in which at least one second permanent magnet 30 is mounted. In other embodiments, as shown in FIG. 6, the second groove 14 may include a plurality of second groove segments 141, in which at least one second groove segment 141 is provided with at least one second permanent magnet 30. In other words, at least one second permanent magnet 30 is provided in one of the second groove segments 141; alternatively, at least one second permanent magnet 30 is provided in a plurality of second groove segments. The extending directions of the plurality of second groove segments 141 can be the same or different; and the second groove segment 141, in which the second permanent magnet 30 is not mounted, is formed as an air segment. In other words, considering the number of the second groove segments 141 in the second groove 14 is D, the number of the second groove segments 141 having the second permanent magnet 30 mounted therein is E out of D, and the number of second groove segments 141 having no second permanent magnet 30 mounted therein is F out of D, D=E+F, and D≥1, E≥1, and F≥0.

In an example shown in FIG. 6, the second groove 14 includes two second groove segments 141 that are in communication with each other and extend in different directions. One of the second groove segments 141 close to the outer peripheral surface of the rotor core 10 is provided with the second permanent magnet 30, and the second permanent magnet 30 is closer to the outer peripheral surface of the rotor core 10, which is conducive to increasing an electromagnetic torque. The other of the second groove segments 141 close to the center point of the rotor core 10 can reduce the magnetic flux leakage at the end of the second permanent magnet 30, which is conducive to improving the utilization rate of the second permanent magnet 30.

It should be noted that in certain embodiments of the present disclosure, the amount of second groove segments 141 in each second groove 14 does not exceed three, i.e., D≤3. The simple structure of the second groove 14 is conducive to reducing the difficulty of the machining process, easy to design and process, and conducive to simplifying the structure of the second permanent magnet 30 within the second groove 14.

In some embodiments, as shown in FIGS. 1 and 6, the air groove 12 may include one third groove segment 121. In other embodiments, as shown in FIG. 5, the air groove 12 may include a plurality of third groove segments 121 extending in a same direction or different directions. In other words, the amount G of the third groove segments 121 included by the air groove 12 is greater than or equal to 1.

In an example shown in FIG. 5, the air groove 12 includes two third groove segments 121 that are in communication with each other and extend in different directions. A part of the rotor core 10 between one of the third groove segments 121, close to the outer peripheral surface of the rotor core 10, and the first groove 13 has a more uniform width to enhance the mechanical strength and satisfy stress requirements for high speed operation.

Groove wall surface structure of the first groove 13, the second groove 14 and the air groove 12 may also be set flexibly according to actual situations and requirements.

In some embodiments, as shown in FIG. 1, in the peripheral direction of the rotor 100, a part of the first groove 13 mounted with the first permanent magnet 20 has two first groove wall surfaces opposite to each other and parallel to each other, and these two first groove wall surfaces are flat and parallel to two side surfaces of the first permanent magnet 20. As a result, the first permanent magnet 20 can be limited by these two first groove wall surfaces of the first groove 13 and be prevented from shaking and coming out. The first permanent magnet 20 and the first groove 13 have simple structures and are easy to process and assemble.

For example, in an embodiment where the first groove 13 includes the first groove segment 131, the first groove segment 131 mounted with the first permanent magnet 20 has two first groove wall planes 132 opposite and parallel to each other, and the two first groove wall planes 132 are formed as the above-mentioned first groove wall surfaces and are parallel to the two side surfaces of the first permanent magnet 20. The first permanent magnet 20 can be reliably limited by the two first groove wall planes 132.

In some embodiments, as shown in FIG. 1, in the peripheral direction of the rotor 100, a part of the second groove 14 mounted with the second permanent magnet 30 has two second groove wall surfaces opposite to each other and parallel to each other, and these two second groove wall surfaces are flat and parallel to two side surfaces of the second permanent magnet 30. As a result, the second permanent magnet 30 can be limited by these two second groove wall surfaces of the second groove 14 and be prevented from shaking and coming out. The second permanent magnet and the second groove 14 have simple structures and are easy to process and assemble.

For example, in an embodiment where the second groove 14 includes the second groove segment 141, the second groove segment 141 mounted with the second permanent magnet 30 has two second groove wall planes 142 opposite and parallel to each other, and the two second groove wall planes 142 are formed as the above-mentioned second groove wall surfaces and are parallel to the two side surfaces of the second permanent magnet 30. The second permanent magnet 30 can be reliably limited by the two second groove wall planes 142.

According to some embodiments of the present disclosure, at least one of the first permanent magnet 20 and the second permanent magnet 30 has a rectangular cross section perpendicular to an axial direction of the rotor 100. The structures of the first permanent magnet 20 and the second permanent magnet 30 are simple, which can reduce the difficulty of production and assembly of machines and ease processing errors. Thus, it is possible to avoid situations that the first permanent magnet 20 is difficult to be assembled with or comes out of the first groove 131 and the second permanent magnet 30 is difficult to be assembled with or comes out of the second groove 141, and improve the qualification rate.

Additionally, in some embodiments of the present disclosure, the groove wall surface of the first groove segment 131, without the first permanent magnet 20 mounted therein, includes one or more types of flat, curved, and bent surfaces; the groove wall surface of the second groove segment 141, without the second permanent magnet 30 mounted therein, includes one or more types of flat, curved, and bent surfaces; the groove wall surface of the third groove segment 121 includes one or more types of flat, curved, and bent surfaces, all of which fall into the protection scope of the present disclosure.

It should be noted that "one or more types of flat, curved, and bent surfaces" means that the groove wall surface of the first groove segment 131 (the second groove segment 141, or the third groove segment 121) may simply be a flat, curved or bent surface; or the groove wall surface of the first groove segment 131 (the second groove segment 141, or the third groove segment 121) may include two kinds of flat, curved, and bent surfaces simultaneously; or the groove wall surface of the first groove segment 131 (the second groove segment 141, or the third groove segment 121) may include three structures simultaneously, i.e., the flat, curved, and bent surfaces. The groove wall surface of the first groove segment 131, the second groove segment 141, or the third groove segment 121 can have a desired shape according to applicable circumstances, apart from the aforementioned flat, curved and bent surfaces.

Additionally, it should be noted that in an embodiment where the first groove 13 includes a plurality of first groove segments 131, groove wall surfaces of the plurality of first groove segments 131 may be connected by straight edges or curved edges; in an embodiment where the second groove 14 includes a plurality of second groove segments 141, groove wall surfaces of the plurality of second groove segments 141 may be connected by straight edges or curved edges; in an embodiment where the air groove 12 includes a plurality of third groove segments 121, groove wall surfaces of the plurality of third groove segments 121 may be connected by straight edges or curved edges, all of which fall into the protection scope of the present disclosure. Connecting by straight edges or curved edges is conducive to reducing the stress concentration at a junction of two adjacent first groove segments 131 (or two adjacent second groove segments 141, or two adjacent third groove segments 121), and improving the mechanical strength and the high-speed performance.

In certain embodiments of the present disclosure, the groove group 11 formed by the air groove 12, the first groove 13 and the second groove 14 may act as a rotor groove for the rotor 100 of a single-layer interior permanent magnet motor, or may act as any one layer of rotor grooves for the rotor 100 of a multilayer interior permanent magnet motor on the premise that geometric constraints are satisfied.

In other words, in some embodiments of the present disclosure, as shown in FIGS. 7-13, the rotor 100 includes a multilayer permanent magnet structure under a common magnetic pole. By the multilayer permanent magnet structure, it means that the permanent magnet structure includes a plurality of layers within a radial cross section of the rotor 100. A part of the rotor core 10 between two adjacent layers of the permanent magnet structure allows magnetic flux to pass. The first permanent magnet 20 and the second permanent magnet 30 within the same groove group 11 constitute one of the layers of the permanent magnet structure.

In some embodiments, the rotor 100 is a rotor 100 of a multilayer interior permanent magnet motor, the rotor 100 further includes a plurality of third permanent magnets 40, and correspondingly, the rotor core 10 is provided with third grooves 41 for mounting the third permanent magnets 40. The plurality of third permanent magnets 40 are mounted in the rotor core and distributed along the peripheral direction of the rotor core 10. The third permanent magnets constitute another layer of the multilayer permanent magnet structure. That is, the first permanent magnet 20 and the second permanent magnet 30, as well as the third permanent magnet in the same groove group 11 constitute two layers of the multilayer permanent magnet structure, and the third grooves 41 and the groove group 11 constitute two layers of rotor grooves in the multilayer interior motor rotor 100.

Figure 7:
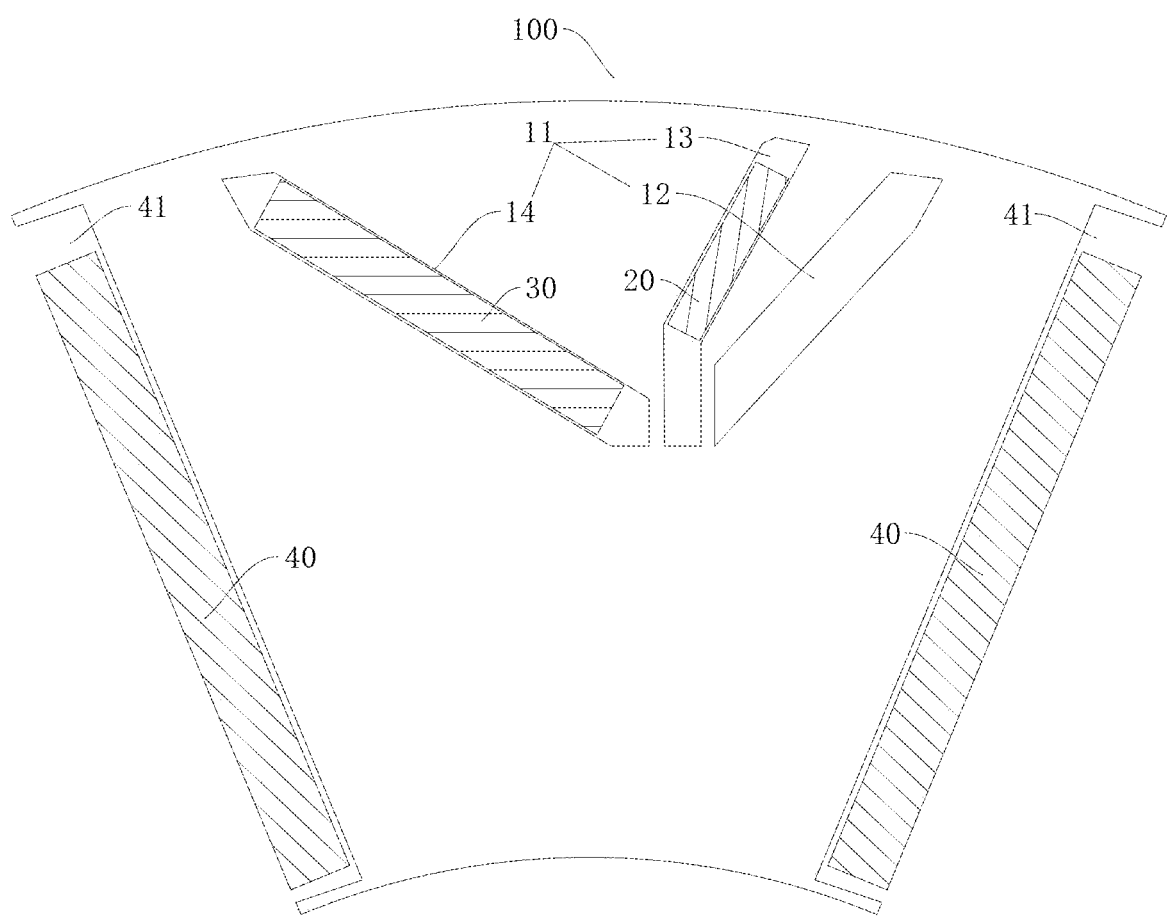
FIG. 7 is a schematic diagram of a partial structure of a rotor according to a fourth embodiment of the present disclosure.

For example, in some exemplary embodiments, as shown in FIG. 7, in the peripheral direction of the rotor core 10, the third groove 41 is arranged between two adjacent groove groups 11, and the third permanent magnet 40 is arranged in the third groove 41 and extends along the radial direction of the rotor core 10 (for example, as shown in FIG. 7) or at an angle to the radial direction of the rotor core 10. That is, the third permanent magnet 40 is a spoke-type permanent magnet structure, and the first permanent magnet 20 and the second permanent magnet 30 within the asymmetric trident-like groove group 11 may be combined with the symmetrical or asymmetric spoke-type permanent magnet structure to cooperate to obtain a larger combined torque as well as to achieve higher utilization rates of both the permanent magnet torque component and the reluctance torque component.

It should be noted that the groove group 11 combined with the spoke-type permanent magnet structure includes, but is not limited to, a structure shown in the embodiment in FIG. 7. In other embodiments, the groove group 11 combined with the spoke-type permanent magnet structure may also be an asymmetric trident-like groove group 11 in an embodiment shown in FIG. 5, in an embodiment shown in FIG. 6, or other embodiments, all of which fall into the protection scope of the present disclosure.

Figure 8:
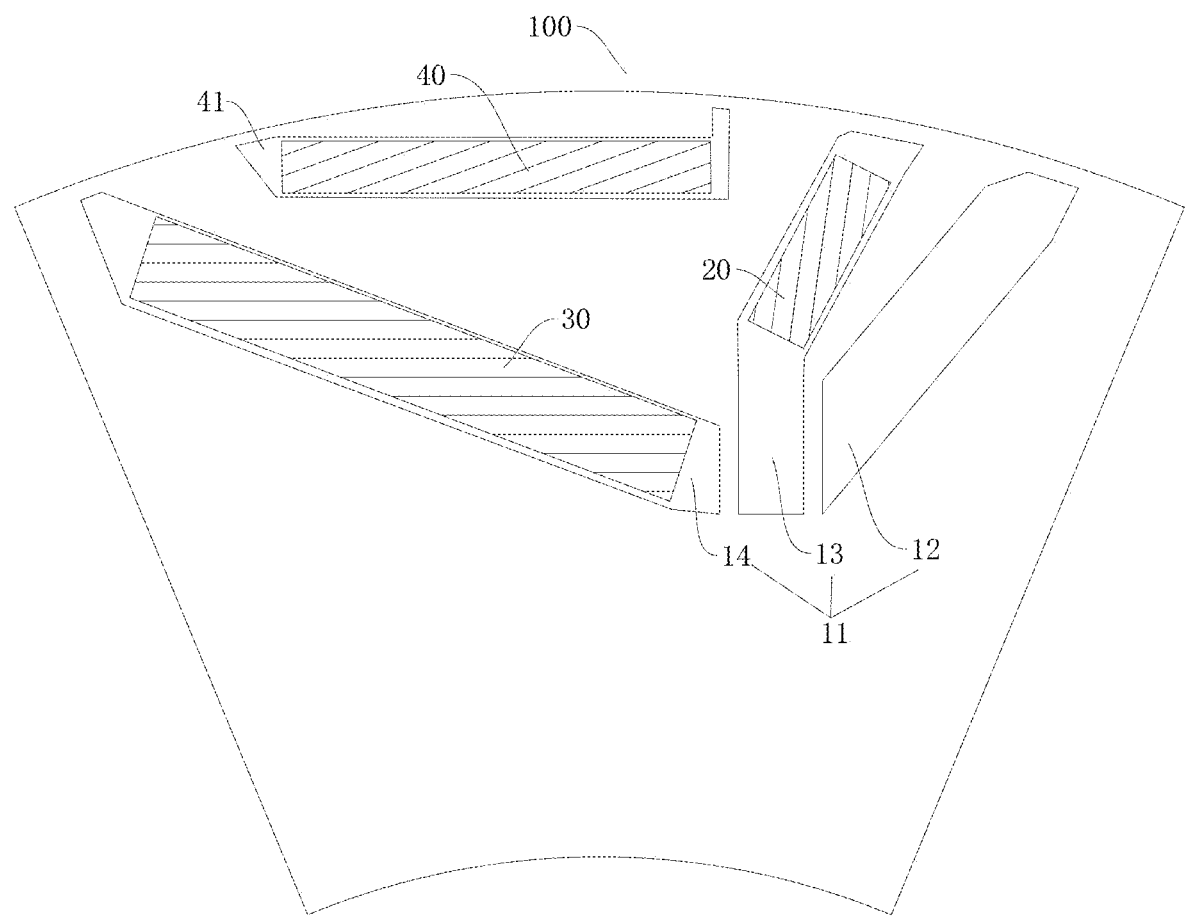
FIG. 8 is a schematic diagram of a partial structure of a rotor according to a fifth embodiment of the present disclosure.
Figure 9:
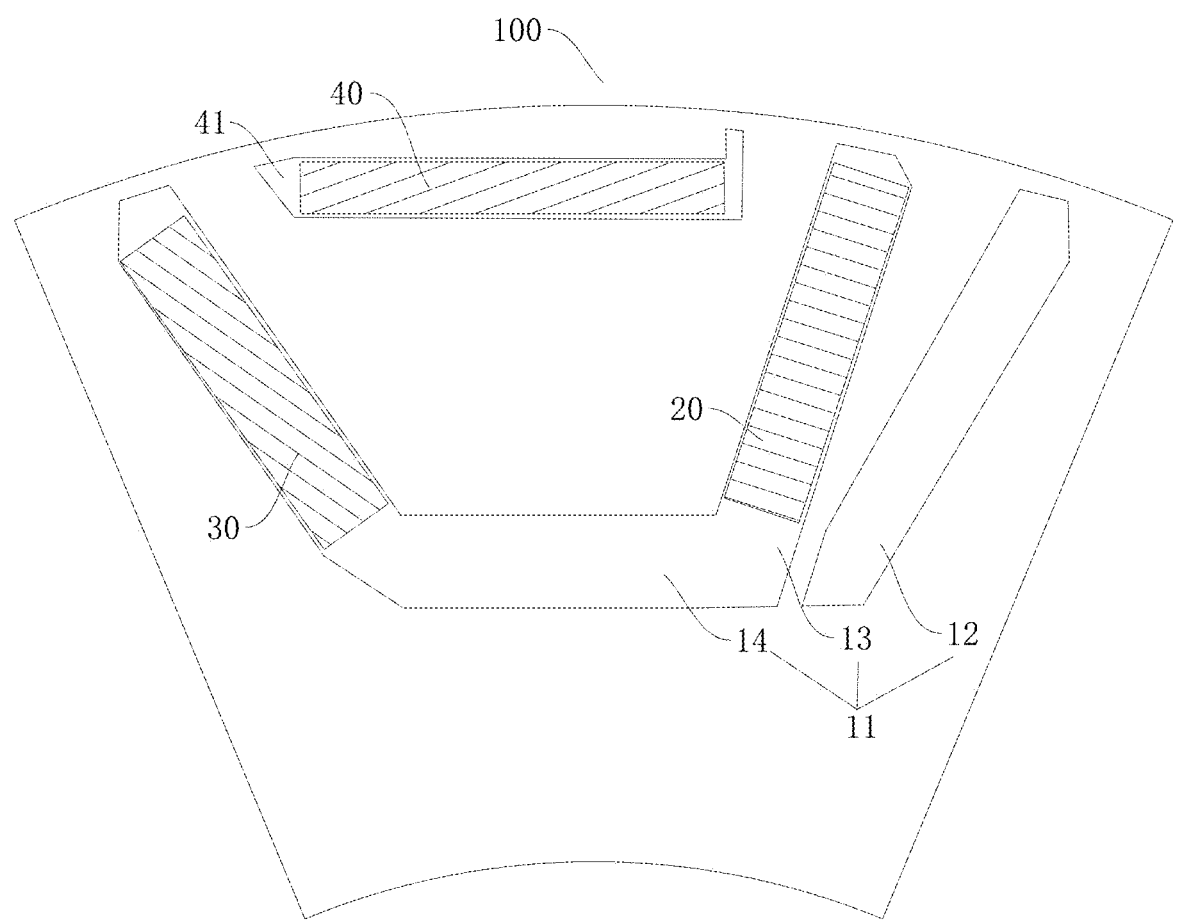
FIG. 9 is a schematic diagram of a partial structure of a rotor according to a sixth embodiment of the present disclosure.
Figure 10:
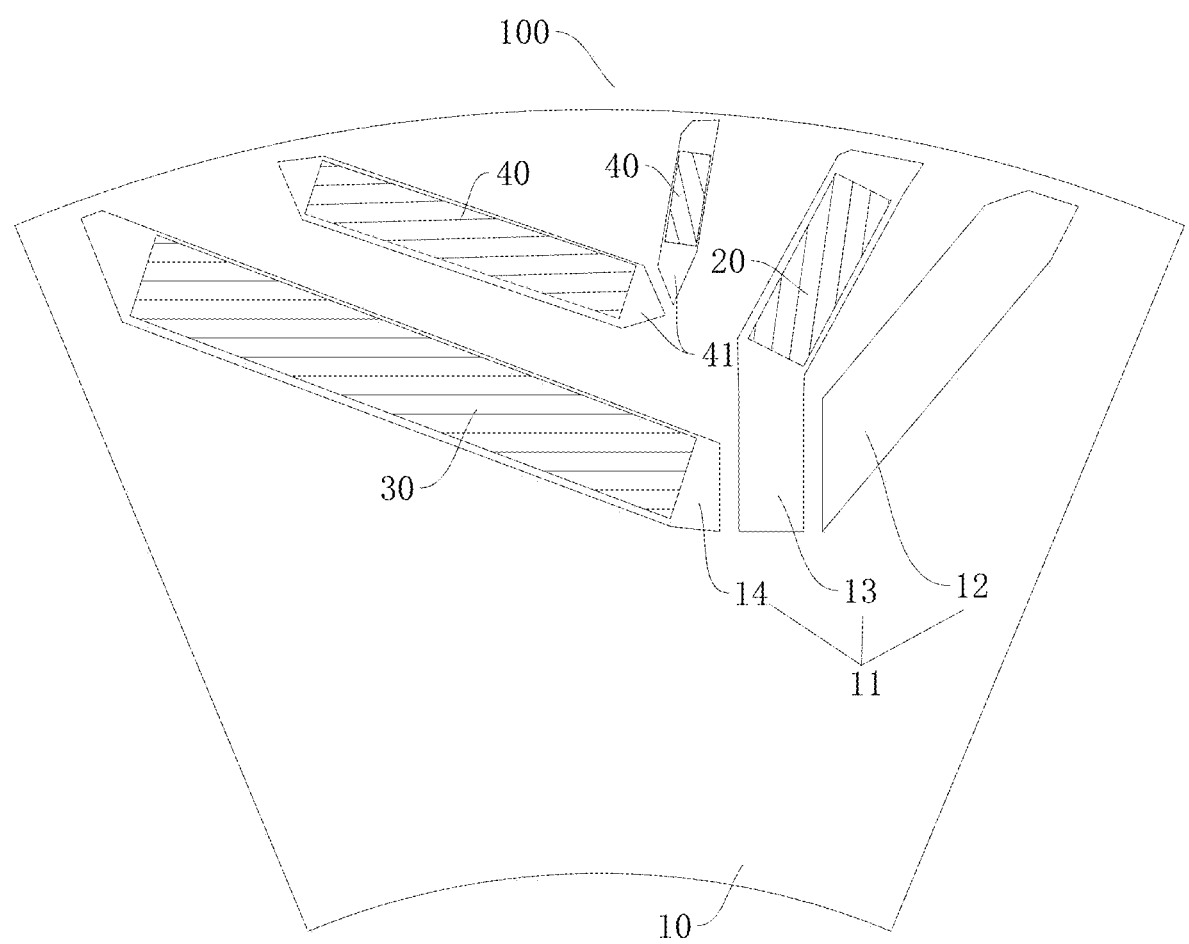
FIG. 10 is a schematic diagram of a partial structure of a rotor according to a seventh embodiment of the present disclosure.
Figure 11:
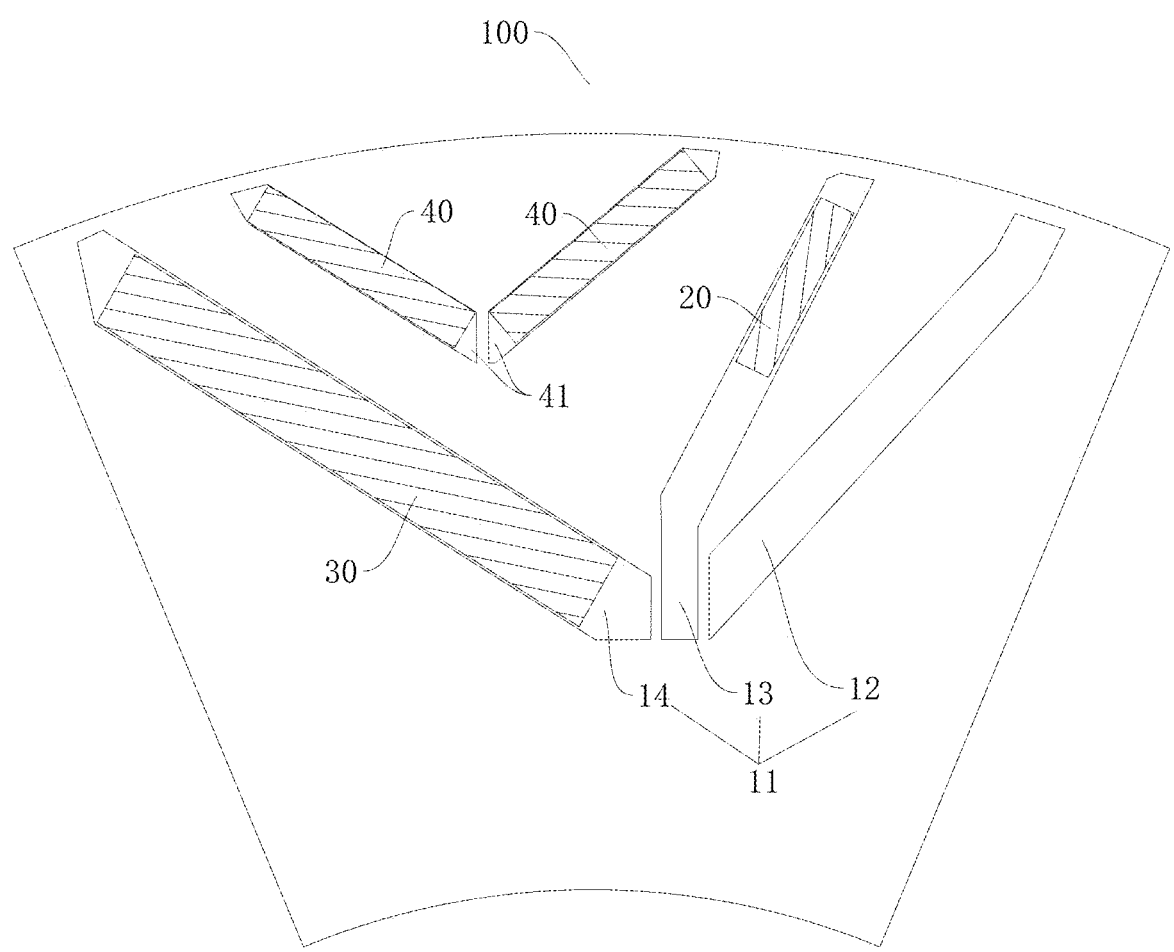
FIG. 11 is a schematic diagram of a partial structure of a rotor according to an eighth embodiment of the present disclosure.

For example, in some other exemplary embodiments, as shown in FIGS. 8-11, in the peripheral direction of the rotor core 10, the third groove 41 is arranged between the first groove 13 and the second groove 14, and the third permanent magnet 40 is arranged in the third groove 41; the groove group 11 is formed as an inner rotor groove, and the third groove 41 is formed as an outer rotor groove. The third permanent magnet 40 may extend perpendicular to the radial direction of the rotor core 10 (e.g., as shown in FIGS. 8 and 9), or may extend at an angle to the radial extension of the rotor core 10 (e.g., as shown in FIG. 10), or may be formed into a V-shaped permanent magnet structure (e.g., as shown in FIG. 11). Here, "the V-shaped permanent magnet structure" may be understood in such a way that a cross section of one third permanent magnet 40, perpendicular to the axial direction of the rotor 100, is V-shaped, or a plurality of third permanent magnets 40 are arranged in a V-shape form in the cross section perpendicular to the axial direction of the rotor 100.

It should be noted that the V-shaped permanent magnet structure between the first groove 13 and the second groove 14 may be a symmetrical permanent magnet structure as shown in FIG. 11, i.e., two sides of the V-shape are of an equal length, or may be an asymmetric permanent magnet structure, i.e., two sides of the V-shape are not of an equal length. In other words, the third permanent magnet 40 is a linear permanent magnet structure or a V-shaped permanent magnet structure, and the asymmetric trident-like groove group 11 may be combined with a symmetric or asymmetric linear permanent magnet structure, or combined with a symmetric or asymmetric V-shaped permanent magnet structure, to cooperate to obtain a larger combined torque and achieve higher utilization rates of the permanent magnet torque component and the reluctance torque component. Additionally, it should be noted that the groove group 11 combined with the linear permanent magnet structure and the V-shaped permanent magnet structure includes, but is not limited to, the structures in the embodiments shown in FIGS. 8-11, as long as it satisfies the geometric constraints.

Figure 12:
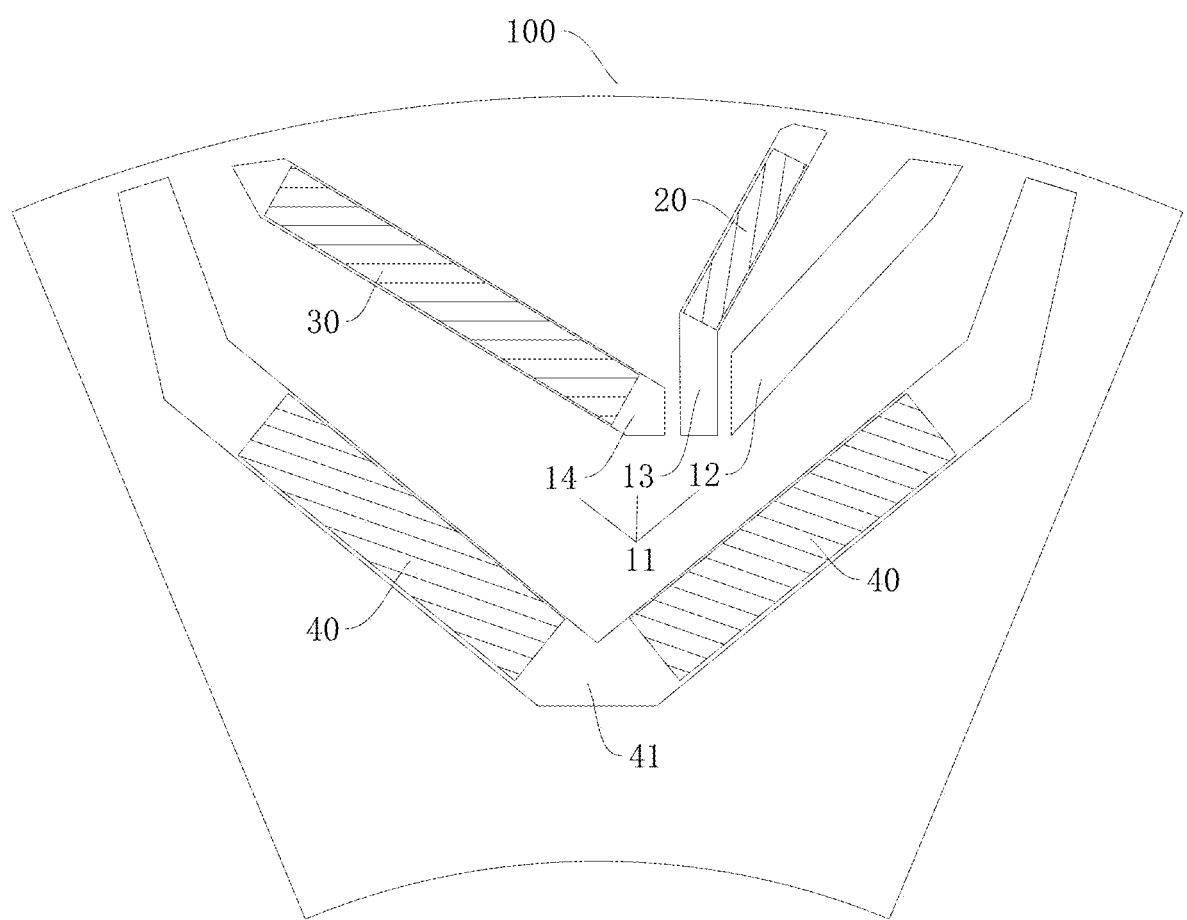
FIG. 12 is a schematic diagram of a partial structure of a rotor according to a ninth embodiment of the present disclosure.
Figure 13:
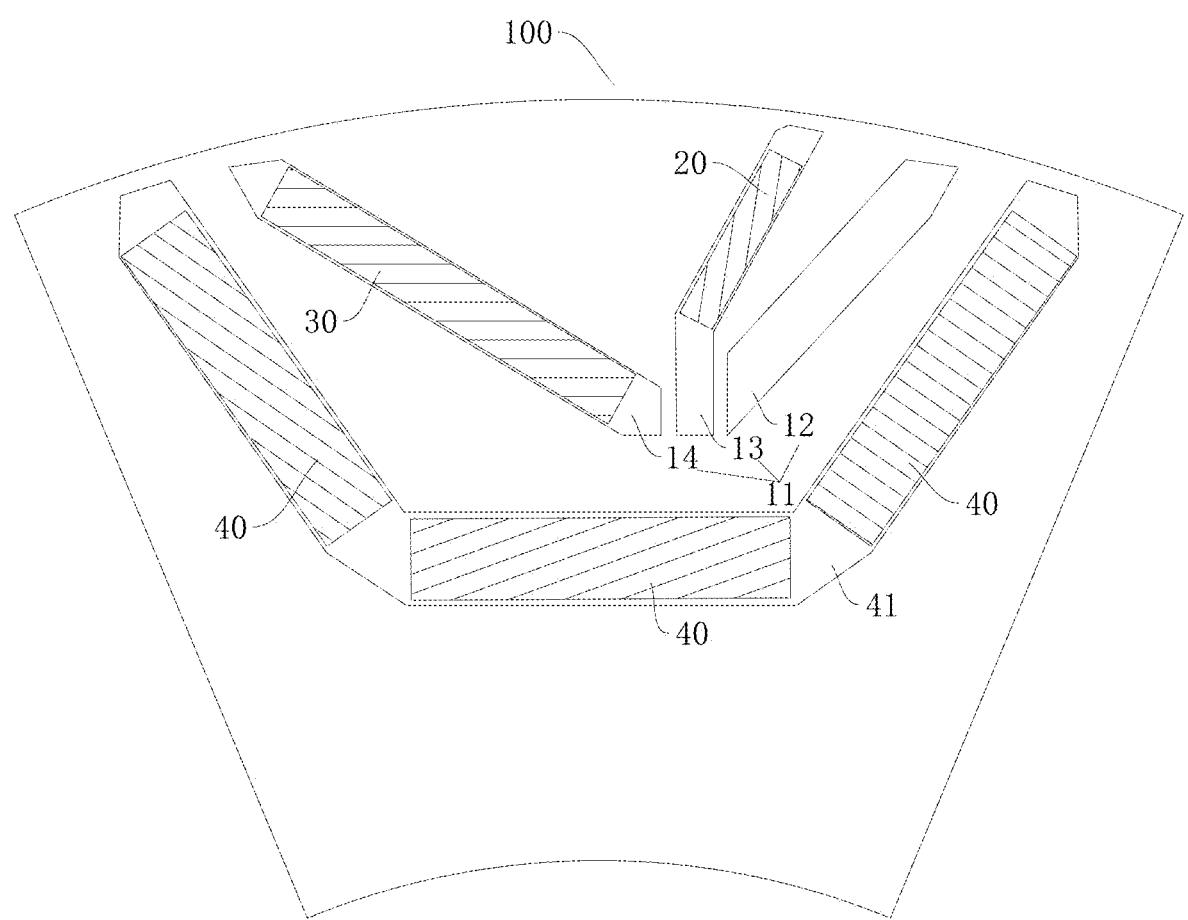
FIG. 13 is a schematic diagram of a partial structure of a rotor according to a tenth embodiment of the present disclosure.

For example, in some further embodiments, as shown in FIGS. 12 and 13, the third groove 41 is arranged on the side of the groove group 11 close to the center point of the rotor core 10; the third permanent magnet 40 is arranged in the third groove 41; the groove group 11 is formed as an outer rotor groove; and the third groove 41 is formed as an inner rotor groove. The third groove 41 is a V-shaped groove with an opening facing away from the center point of the rotor core 10, the third permanent magnet 40 is formed as a V-shaped permanent magnet structure (e.g., as shown in FIG. 12), and the groove group 11 is located within an area enclosed by the V-shaped groove. Alternatively, the third groove 41 is a U-shaped groove with an opening facing away from the center point of the rotor core 10, the third permanent magnet 40 is formed as a U-shaped permanent magnet structure (e.g., as shown in FIG. 13), and the groove group 11 is located within an area enclosed by the U-shaped groove.

It should be noted that the V-shaped permanent magnet structure on the side of the groove group 11 close to the center point of the rotor core 10 may be a symmetrical permanent magnet structure as shown in FIG. 12, i.e., two side edges of the V-shape are of an equal length, or may be an asymmetric permanent magnet structure, i.e., two side edges of the V-shape are not of an equal length. The U-shaped permanent magnet structure may be a symmetrical permanent magnet structure as shown in FIG. 13, i.e., two side edges of the U-shape are symmetrical with respect to a centerline of a bottom edge, or may be an asymmetric permanent magnet structure, i.e., two side edges of the U-shape are asymmetric with respect to the centerline of the bottom edge.

That is, the third permanent magnet 40 is a V-shaped permanent magnet structure or a U-shaped permanent magnet structure, and the asymmetric trident-like groove group 11 can be combined with a symmetric or asymmetric V-shaped permanent magnet structure or with a symmetric or asymmetric U-shaped permanent magnet structure, to cooperate to obtain a larger combined torque, as well as to achieve higher utilization rates of the permanent magnet torque component and the reluctance torque component. Also, it should be noted that the groove group 11 combined with the V-shaped permanent magnet structure and the U-shaped permanent magnet structure includes, but is not limited to, the structures in the embodiments shown in FIG. 12 and FIG. 13, as long as the geometric constraints are satisfied.

Figure 14:
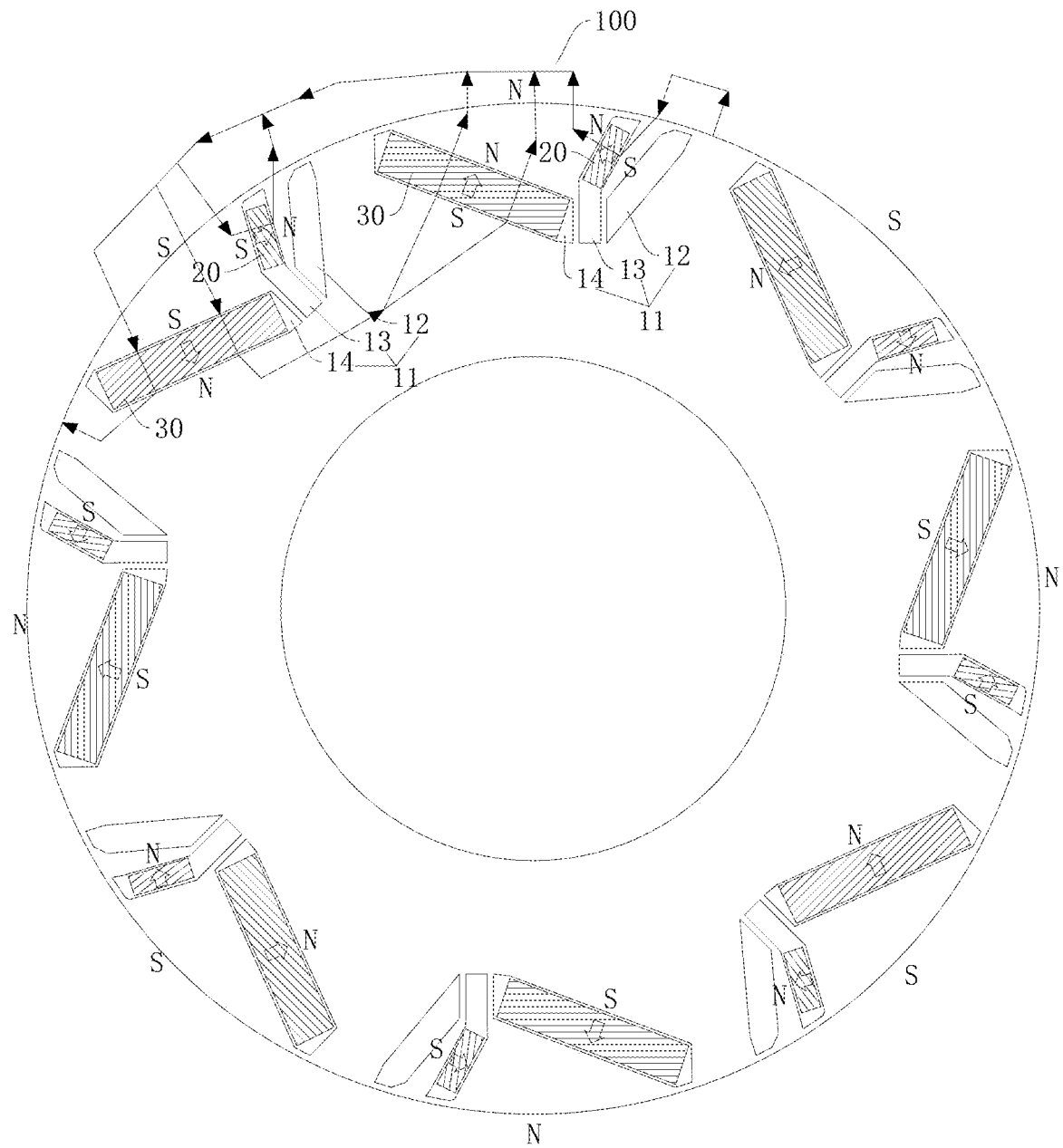
FIG. 14 is a schematic diagram of a partial structure of a rotor according to the first embodiment of the present disclosure.

In certain embodiments of the present disclosure, as shown in FIG. 14, the first permanent magnet 20 and the second permanent magnet 30 within the same groove group 11 are magnetized in a same direction. In other words, air gap magnetic fields generated by the first permanent magnet 20 and the second permanent magnet 30 within the same groove group 11 are mutually reinforced. The magnetic field inside the permanent magnets (including the first permanent magnet and the second permanent magnet 30) is directed from an S pole to an N pole in terms of its external representation, and the first permanent magnet 20 and the second permanent magnet 30 in the same groove group 11 correspond to the same pole. The first permanent magnet 20 and the second permanent magnet 30 under the same pole produce magnetic fluxes with the same radial direction in the air gap, so that the magnetization direction of each permanent magnet in the same groove group 11 mutually reinforces the air gap magnetic field generated by another permanent magnet in the same groove group. The first permanent magnets 20 in adjacent groove groups 11 are magnetized in opposite directions, and the second permanent magnets 30 in adjacent groove groups 11 are magnetized in opposite directions to facilitate the formation of a closed magnetic circuit.

In an embodiment where the first permanent magnet 20 (or the second permanent magnet 30) has a rectangular cross-section perpendicular to the axial direction of the rotor 100, the first permanent magnet 20 is magnetized along a short side of the rectangle, that is, it is magnetized perpendicular to a long side of the rectangle, i.e., the magnetization direction is parallel to the short side of the rectangle.

In some embodiments of the present disclosure, as shown in FIG. 14, the amount M of groove groups 11 is equal to the amount K of poles of the rotor 100, i.e., M=K. That is, each pole corresponds to one groove group 11 as well as the first permanent magnet 20 and the second permanent magnet 30 in that groove group 11, and the rotor groove structure under each pole is simple, reducing the structural design difficulty and improving the structural strength.

For example, in some exemplary embodiments, the amount K of poles of the rotor 100 is an even amount and satisfies 4≤K≤12, that is, the rotor 100 may have four, six, eight, ten or twelve poles, so that the rotor 100 can meet the needs of more motors. Accordingly, the groove group 11, the first permanent magnet 20, and the second permanent magnet 30 can also become more reasonable in size design, thereby facilitating improvement of the electromagnetic torque and the structural strength.

A drive motor according to certain embodiments of the present disclosure includes the rotor 100 according to certain embodiments of the present disclosure. Since the rotor 100 according to certain embodiments of the present disclosure has the above beneficial technical effect, the drive motor according to certain embodiments of the present disclosure, using the asymmetric structure of the rotor 100, can significantly reduce the difference between the current advancing angle corresponding to the peak point of the permanent magnet torque and the current advancing angle corresponding to the peak point of the reluctance torque, enhance the maximum torque, and improve the utilization rates of the motor as well as the permanent magnet torque and reluctance torque components at the maximum torque point, on the premise of having the same amount of permanent magnets and the same inner and outer diameters of the rotor 100. Thus, it is conducive to increasing the power density of the motor, reducing the permanent magnetic flux leakage, improving the material utilization rate, reducing the amount of permanent magnets, and lowering the production cost.

When the rotor 100 is used in the drive motor, the torque of the drive motor may be increased, and the vehicle has strong climbing, starting and acceleration abilities. The drive motor has good high-speed performance and large maximum speed, and the volume and weight of the drive motor may be reduced, saving space and reducing the weight of the vehicle. The drive motor has a wide range of speed regulation, which can meet the requirements of the vehicle in different road conditions.

A vehicle according to certain embodiments of the present disclosure includes the drive motor according to certain embodiments of the present disclosure. Since the drive motor according to certain embodiments of the present disclosure has the above beneficial technical effects, the vehicle embodiments of the present disclosure, using the asymmetric structure of the rotor 100, can significantly reduce the difference between the current advancing angle corresponding to the peak point of the permanent magnet torque and the current advancing angle corresponding to the peak point of the reluctance torque, enhance the maximum torque of the motor, and improve the utilization rates of the permanent magnet torque and reluctance torque components at the maximum torque point, on the premise of having the same amount of permanent magnets and the same inner and outer diameters of the rotor 100. Thus, it is conducive to increasing the power density of the motor, reducing the permanent magnetic flux leakage, improving the material utilization rate, reducing the amount of permanent magnets, and lowering the production cost.

When the drive motor is used in the vehicle, the torque of the drive motor may be increased, and the vehicle has strong climbing, starting and acceleration abilities. The drive motor has good high-speed performance and large maximum speed, and the volume and weight of the drive motor may be reduced, saving space and reducing the weight of the vehicle. The drive motor has a wide range of speed regulation, which can meet the requirements of the vehicle in different road conditions.

Other configurations and operations of the vehicle, the drive motor and the rotor 100 according to certain embodiments of the present disclosure are known to a person of ordinary skill in the art and will not be described in detail here.

In the specification, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the specification, reference to terms "an embodiment," "a specific embodiment," "an example" or the like means that a particular feature, structure, material, or characteristic described in connection with the embodiment or example is included in at least one embodiment or example of the present disclosure. In this specification, the above terms are not necessarily referring to the same embodiment or example. Furthermore, the particular features, structures, materials, or characteristics described may be combined in any suitable manner in any one or more embodiments or examples.

Although embodiments of the present disclosure have been shown and described, it can be appreciated by those skilled in the art that various changes, modifications, alternatives and variants can be made to these embodiments without departing from the principle and purpose of the present disclosure. The scope of the present disclosure is limited by claims and their equivalents.

What is claimed is:

1. A rotor for a motor, comprising:
a rotor core comprising:
a plurality of groove groups distributed along a peripheral direction of the rotor core, each groove group comprising an air groove, a first groove, and a second groove, wherein respective first ends, near a center point of the rotor core, of the air groove, the first groove, and the second groove are close to one another, and respective second ends, away from the center point of the rotor core, of the air groove, the first groove, and the second groove are away from one another;
a first magnetic isolation structure arranged between the first end of the air groove and the first end of the first groove that are close to each other; and
a second magnetic isolation structure arranged between the first end of the first groove and the first end of the second groove that are close to each other,
wherein:
the second ends, away from the center point of the rotor core, of the air groove, the first groove and the second groove are distributed along a first rotation direction of the rotor; and
each of the groove groups is asymmetrical about a line through a center of a smallest sector of the rotor core that encompasses the respective groove group;
a plurality of first permanent magnets each mounted in a respective first groove; and
a plurality of second permanent magnets each mounted in a respective second groove.

2. The rotor according to claim 1, wherein:
the first groove comprises a third magnetic isolation structure on a side of the first groove away from the center point of the rotor core, the second groove comprises a fourth magnetic isolation structure on a side of the second groove away from the center point of the rotor core, and the air groove comprises a fifth magnetic isolation structure on a side of the air groove away from the center point of the rotor core; and
along the first rotation direction, an angle α formed between a line connecting a back endpoint of the third magnetic isolation structure to the center point of the rotor core and a line connecting a back endpoint of the fifth magnetic isolation structure to the center point of the rotor core is smaller than an angle β formed between the line connecting the back endpoint of the third magnetic isolation structure to the center point of the rotor core and a line connecting an advancing endpoint of the fourth magnetic isolation structure to the center point of the rotor core.

3. The rotor according to claim 1, wherein an interval L1 between a first end of a first permanent magnet near the center point of the rotor core and a second end of the first permanent magnet away from the center point of the rotor core is less than or equal to an interval L2 between a first end of a second permanent magnet near the center point of the rotor core and a second end of the second permanent magnet away from the center point of the rotor core.

4. The rotor according to claim 1, wherein:
the first magnetic isolation structure comprises a first internal magnetic bridge between the first end of the air groove and the first end of the first groove close to each other, or a first connection port connecting the first end of the air groove with the first end of the first groove close to each other; or
the second magnetic isolation structure comprises a second internal magnetic bridge between the first end of the first groove and the first end of the second groove close to each other, or a second connection port connecting the first end of the first groove with the first end of the second groove close to each other.

5. The rotor according to claim 1, wherein:
the first magnetic isolation structure comprises a first internal magnetic bridge between the first end of the air groove and the first end of the first groove close to each other, and a thickness of the first internal magnetic bridge along the peripheral direction of the rotor core is equal to 4 mm, or greater than 0 mm and less than 4 mm; or
the second magnetic isolation structure comprises a second internal magnetic bridge between the first end of the first groove and the first end of the second groove close to each other, and a thickness of the second internal magnetic bridge along the peripheral direction of the rotor core is equal to 4 mm, or greater than 0 mm and less than 4 mm.

6. The rotor according to claim 1, wherein:
the first groove comprises a third magnetic isolation structure on a side of the first groove away from the center point of the rotor core, and the third magnetic isolation structure comprises a first external magnetic bridge between the second end of the first groove away from the center point of the rotor core and an outer peripheral surface of the rotor core or comprises a first groove opening formed on the outer peripheral surface of the rotor core by the second end of the first groove away from the center point of the rotor core, wherein the second end of the first groove extends to the outer peripheral surface of the rotor core; or
the second groove comprises a fourth magnetic isolation structure on a side of the second groove away from the center point of the rotor core, and the fourth magnetic isolation structure comprises a second external magnetic bridge between the second end of the second groove away from the center point of the rotor core and the outer peripheral surface of the rotor core or comprises a second groove opening formed on the outer peripheral surface of the rotor core by the second end of the second groove away from the center point of the rotor core, wherein the second end of the second groove extends to the outer peripheral surface of the rotor core; or the air groove comprises a fifth magnetic isolation structure on a side of the air groove away from the center point of the rotor core, and the fifth magnetic isolation structure comprises a third external magnetic bridge between the second end of the air groove away from the center point of the rotor core and the outer peripheral surface of the rotor core or comprises a third groove opening formed on the outer peripheral surface of the rotor core by the second end of the air groove away from the center point of the rotor core, wherein the second end of the air groove extends to the outer peripheral surface of the rotor core.

7. The rotor according to claim 1, wherein:
a first external magnetic bridge is formed between the second end of the first groove away from the center point of the rotor core and an outer peripheral surface of the rotor core, and a thickness of the first external magnetic bridge along a radial direction of the rotor core is equal to 3.5 mm, or greater than 0 mm and less than 3.5 mm; or
a second external magnetic bridge is formed between the second end of the second groove away from the center point of the rotor core and the outer peripheral surface of the rotor core, and a thickness of the second external magnetic bridge along the radial direction of the rotor core is equal to 3.5 mm, or greater than 0 mm and less than 3.5 mm; or
a third external magnetic bridge is formed between the second end of the air groove away from the center point of the rotor core and the outer peripheral surface of the rotor core, and a thickness of the third external magnetic bridge along the radial direction of the rotor core is equal to 3.5 mm, or greater than 0 mm and less than 3.5 mm.

8. The rotor according to claim 1, wherein the rotor core further comprises:
a first part on a first side of the groove group close to the center point of the rotor core; and
a second part on a second side of the groove group away from the center point of the rotor core,
wherein:
the first part and the second part are connected through a first connection section;
the second part comprises a third portion and a fourth portion; and
the third portion is located between the first groove and the second groove, and the fourth portion is located between the air groove and the first groove in the peripheral direction of the rotor core, and
wherein:
the third portion and the fourth portion are connected to the first part through the first connection section, and the third portion and the fourth portion are not directly connected to each other; or
the third portion and the fourth portion are connected by a second connection section, and at least one of the third portion and the fourth portion are connected to the first part through the first connection section.

9. The rotor according to claim 1, wherein:
an amount of poles of the rotor is K;
a fourth magnetic isolation structure is arranged on a side of the second groove away from the center point of the rotor core, and a fifth magnetic isolation structure is arranged on a side of the air groove away from the center point of the rotor core; and
an angle γ formed between a line connecting a back endpoint of the fifth magnetic isolation structure to the center point of the rotor core and a line connecting an advancing endpoint of the fourth magnetic isolation structure to the center point of the rotor core, along the first rotation direction, is less than or equal to 170°/K.

10. The rotor according to claim 1, wherein:
the first groove comprises at least one first groove segment, the first permanent magnets are mounted in the at least one first groove segment, and the at least one first groove segment extends in a same direction or different directions; and
the second groove comprises at least one second groove segment, the second permanent magnets are mounted in the at least one second groove segment, and the at least one second groove segment extends in a same direction or different directions.

11. The rotor according to claim 10, wherein an amount of the first groove segments in each first groove does not exceed three, and an amount of the second groove segments in each second groove does not exceed three.

12. The rotor according to claim 10, wherein:
a groove wall surface of the first groove segment without the first permanent magnet comprises at least one of a flat surface, a curved surface and a bent surface; and
a groove wall surface of the second groove segment without the second permanent magnet comprises at least one of a flat surface, a curved surface and a bent surface.

13. The rotor according to claim 1, wherein the air groove comprises at least one third groove segment, and a groove wall surface of the at least one third groove segment comprises at least one of a flat surface, a curved surface and a bent surface.

14. The rotor according to claim 1, wherein the rotor comprises a multilayer permanent magnet structure under a common magnetic pole, and the first permanent magnet and the second permanent magnet within the same groove group constitute one layer of the permanent magnet structure.

15. The rotor according to claim 14, further comprising:
a plurality of third permanent magnets mounted in the rotor core, distributed along the peripheral direction of the rotor core, and constituting another layer of the permanent magnet structure.

16. The rotor according to claim 15, wherein:
the third permanent magnet is arranged between the first groove and the second groove of the groove group in the peripheral direction of the rotor core; and
the third permanent magnet extends perpendicular to a radial direction of the rotor core or at an angle to the radial extension of the rotor core, or forms a V-shaped permanent magnet structure.

17. The rotor according to claim 15, wherein:
the third permanent magnet is arranged between two adjacent groove groups in the peripheral direction of the rotor core; and
the third permanent magnet extends along a radial direction of the rotor core or at an angle to the radial direction of the rotor core.

18. The rotor according to claim 15, wherein:
a third groove is arranged on side of the groove group close to the center point of the rotor core and is a V-shaped or U-shaped groove;

the third permanent magnets are arranged in the third groove and formed as a V-shaped or U-shaped permanent magnet structure; and the groove group is located within an area enclosed by the V-shaped or U-shaped groove.

19. The rotor according to claim 1, wherein:

air gap magnetic fields generated by the first permanent magnet and the second permanent magnet within a same groove group are mutually reinforced; and the first permanent magnets in adjacent groove groups are magnetized in opposite directions, and the second permanent magnets in adjacent groove groups are magnetized in opposite directions.

20. The rotor according to claim 1, wherein an amount M of the groove groups is equal to an amount K of poles of the rotor.

21. A drive motor comprising:

a rotor comprising:

a rotor core comprising:

a plurality of groove groups distributed along a peripheral direction of the rotor core, each groove group comprising an air groove, a first groove, and a second groove, wherein respective first ends, near a center point of the rotor core, of the air groove, the first groove, and the second groove are close to one another, and respective second ends, away from the center point of the rotor core, of the air groove, the first groove, and the second groove are away from one another;

a first magnetic isolation structure arranged between the first end of the air groove and the first end of the first groove that are close to each other; and a second magnetic isolation structure arranged between the first end of the first groove and the first end of the second groove that are close to each other;

wherein:

the second ends, away from the center point of the rotor core, of the air groove, the first groove and the second groove are distributed along a first rotation direction of the rotor; and each of the groove groups is asymmetrical about a line through a center of a smallest sector of the rotor core that encompasses the respective groove group;

a plurality of first permanent magnets each mounted in a respective first groove; and a plurality of second permanent magnets each mounted in a respective second groove.

22. A vehicle comprising:

a drive motor comprising:

a rotor comprising:

a rotor core comprising:

a plurality of groove groups distributed along a peripheral direction of the rotor core, each groove group comprising an air groove, a first groove, and a second groove, wherein respective first ends, near a center point of the rotor core, of the air groove, the first groove, and the second groove are close to one another, and respective second ends, away from the center point of the rotor core, of the air groove, the first groove, and the second groove are away from one another;

a first magnetic isolation structure arranged between the first end of the air groove and the first end of the first groove that are close to each other; and a second magnetic isolation structure arranged between the first end of the first groove and the first end of the second groove that are close to each other;

wherein:

the second ends, away from the center point of the rotor core, of the air groove, the first groove and the second groove are distributed along a first rotation direction of the rotor; and each of the groove groups is asymmetrical about a line through a center of a smallest sector of the rotor core that encompasses the respective groove group;

a plurality of first permanent magnets each mounted in a respective first groove; and a plurality of second permanent magnets each mounted in a respective second groove.

* * * * *